US012580802B1

(12) United States Patent    (10) Patent No.:    US 12,580,802 B1
Pinto et al.    (45) Date of Patent:    Mar. 17, 2026

(54) CARRIER FREQUENCY OFFSET COMPENSATION

(71) Applicant: Amazon Technologies, Inc., Seattle, WA (US)

(72) Inventors: Ryan Pinto, Poway, CA (US); Wenxun Qiu, Sammamish, WA (US); Yi Tang, Issaquah, WA (US); Ozan Akyildiz, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 9 days.

(21) Appl. No.: 18/422,834

(22) Filed: Jan. 25, 2024

(51) Int. Cl.
*H04L 27/26*    (2006.01)
*H04L 27/00*    (2006.01)
*H04B 1/00*    (2006.01)

(52) U.S. Cl.
CPC ...... *H04L 27/2657* (2013.01); *H04L 27/0014* (2013.01); *H04B 1/0003* (2013.01); *H04L 2027/0026* (2013.01)

(58) Field of Classification Search
CPC ............ H04L 27/2657; H04L 27/0014; H04B 1/0003
USPC ........................................................ 375/262
See application file for complete search history.

(56) References Cited

U.S. PATENT DOCUMENTS

2009/0045992 A1* 2/2009 Tracht .................. H03H 17/028
                                                        375/295
2018/0183445 A1* 6/2018 Lu .......................... H03L 7/0893
2019/0279641 A1* 9/2019 Simileysky ......... G10L 15/1815

* cited by examiner

*Primary Examiner* — Leila Malek

(74) *Attorney, Agent, or Firm* — Kilpatrick Townsend & Stockton LLP

(57) ABSTRACT

Technologies directed to carrier frequency offset (CFO) compensation is described. An input buffer receives a first set of incoming samples associated with a first frequency from an incoming data stream. A first outgoing sample of an outgoing data stream is generated using the first set of incoming samples. The first outgoing sample is associated with a second frequency. A ratio between the first and second frequencies is used to determine that the first outgoing sample is associated with a misalignment between the incoming data stream and the outgoing data stream. The input buffer receives a second set of incoming samples associated with the first frequency from the incoming data stream. A second outgoing sample of the outgoing data stream is generated using the second set of incoming samples. The second outgoing sample is associated with the second frequency. The first outgoing sample is overwritten by the second outgoing sample.

19 Claims, 17 Drawing Sheets

900a

900b

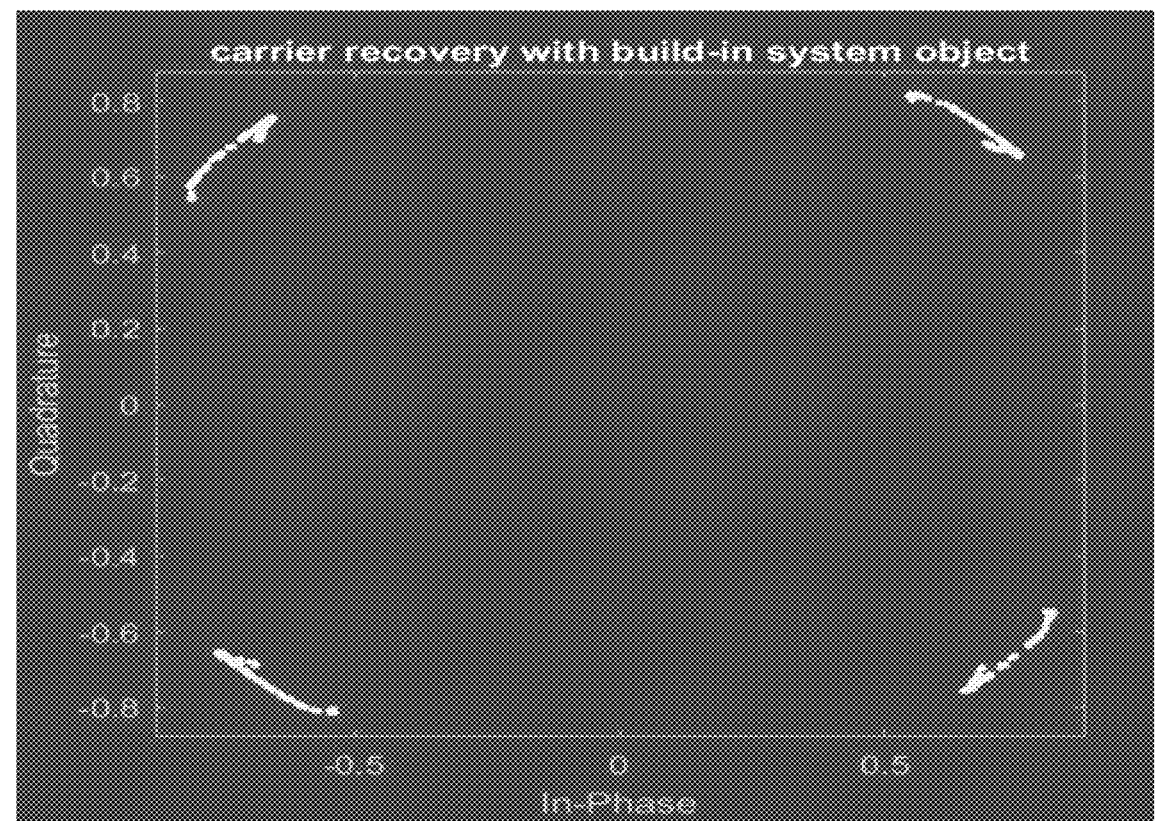
FIG. 9C

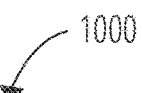

RECEIVE, BY AN INPUT BUFFER, A FIRST SET OF SAMPLES OF AN INCOMING STREAM ASSOCIATED WITH A FIRST FREQUENCY 1002

GENERATE, USING THE FIRST SET OF INCOMING SAMPLES, A FIRST OUTGOING SAMPLE ASSOCIATED WITH A SECOND FREQUENCY LOWER THAN THE FIRST FREQUENCY 1004

RECEIVE, BY AN OUTPUT BUFFER, THE FIRST OUTGOING SAMPLE 1006

DETERMINE, USING A FIRST RATIO BETWEEN THE FIRST AND SECOND FREQUENCIES, THAT THE FIRST OUTGOING SAMPLE IS ASSOCIATED WITH A MISALIGNMENT BETWEEN THE INCOMING STREAM AND THE OUTGOING STREAM 1008

RECEIVE, BY THE INPUT BUFFER, A NEXT INCOMING SAMPLE ASSOCIATED WITH THE FIRST FREQUENCY 1010

GENERATE, USING A SECOND SET OF INCOMING SAMPLES INCLUDING THE NEXT INCOMING SAMPLE, A SECOND OUTGOING SAMPLE ASSOCIATED WITH THE SECOND FREQUENCY 1012

OVERWRITE THE FIRST OUTGOING SAMPLE WITH THE SECOND OUTGOING SAMPLE 1014

FIG. 10

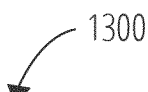

1300

SATELLITE 1202

STRUCTURAL SYSTEM 1214

BUS(ES) 1306

SENSOR(S) 1302
ENGINEERING CAMERA 1326
ACCELEROMETER 1328
GYROSCOPE 1330
GNSS 1332
STAR TRACKER 1334
COARSE SUN SENSOR 1336

CONTROL SYSTEM 1220
FLIGHT CONTROL PROCESSOR 1308
TRACKING, TELEMETRY, CONTROL SYSTEM 1310
POWER MANAGEMENT AND DISTRIBUTION (PMAD) SYSTEM 1312

POWER SYSTEM 1226
PHOTOVOLTAIC PV ARRAY(S) 1316
PV ARRAY ACTUATOR 1318
BATTERY(S) 1314

COMMUNICATION SYSTEM 1238
INTERSATELLITE LINK FPGA 1344
ISL TRANSCEIVER 1346
COMMUNICATION FPGA 1348
MODEM 1338
DOWNLINK TRANSMITTER 1350
UPLINK TRANSMITTER 1352
ANTENNA(S) 1340
CALIBRATION ANTENNA 1342

RESAMPLING LOGIC 110

MANEUVERING SYSTEM 1232
REACTION WHEEL(S) 1320
THRUSTER(S) 1322
MAGNETIC TORQUE ROD(S) 1324

PULSE PER SECOND SYSTEM 1304

FIG. 13

CARRIER FREQUENCY OFFSET COMPENSATION

BACKGROUND

A large and growing population of users is enjoying entertainment through the consumption of digital media items, such as music, movies, images, electronic books, and so on. The users employ various electronic devices to consume such media items.

Satellite-based broadband internet constellations are being developed to provide high-speed, low-latency broadband internet access to locations around the world using a network of low Earth orbit (LEO) satellites, ground stations, and user terminals (UTs) (also called customer terminals (CTs).

BRIEF DESCRIPTION OF THE SEVERAL VIEWS OF THE DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 9C is a constellation graph of the transmitted signal after passing through resampling logic, according to one embodiment.

FIG. 10 is a flowchart illustrating a method of resampling, according to one embodiment.

FIG. 13 is a functional block diagram of some systems associated with the satellite, according to at least one embodiment.

DETAILED DESCRIPTION

Figure 1:
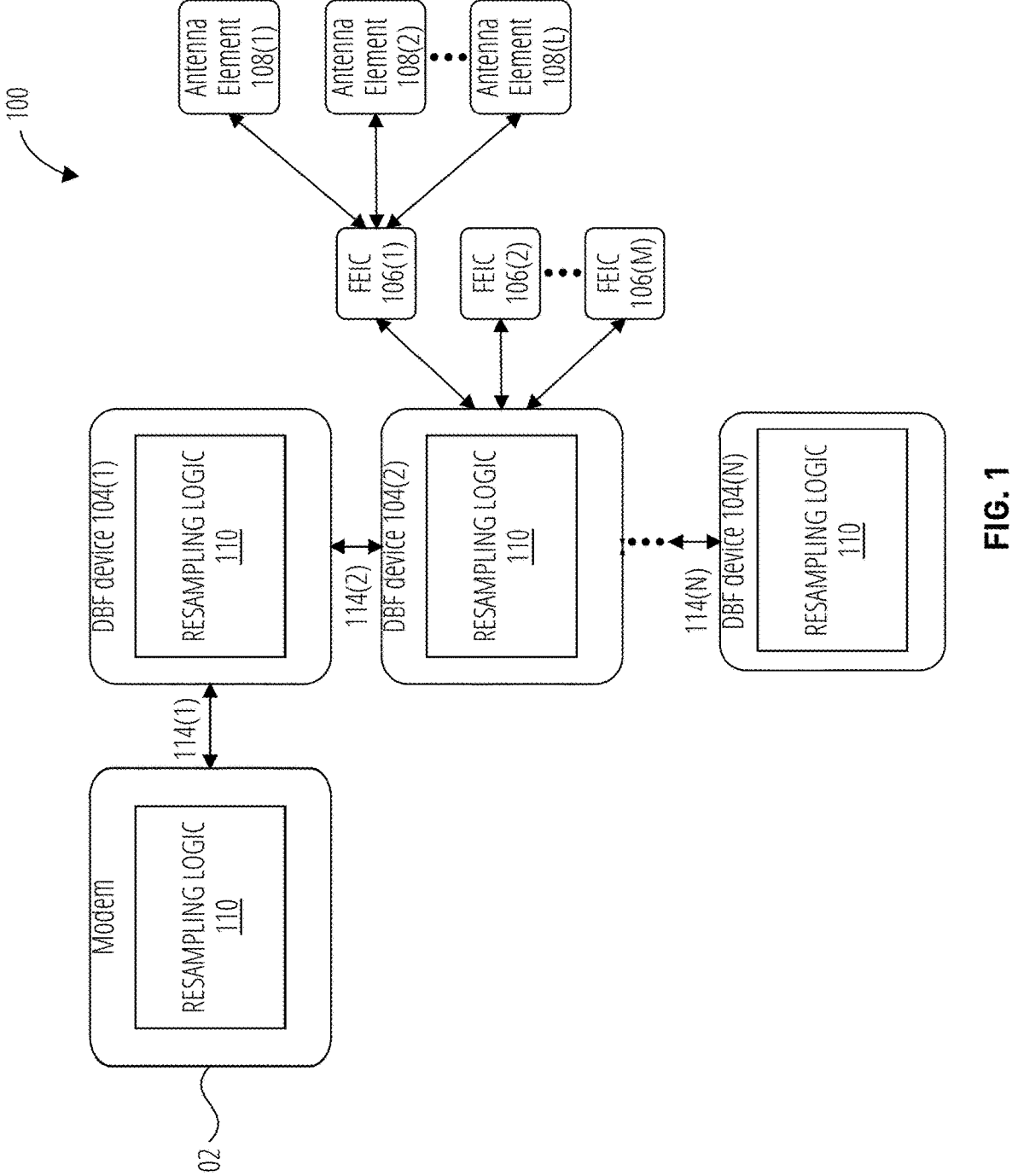
FIG. 1 is a block diagram of a communication subsystem of a beamforming system, including a modem, multiple digital beamforming (DBF) devices, multiple front-end integrated circuits (FEICs), and multiple antenna elements, according to one embodiment.

Technologies directed to carrier frequency offset (CFO) compensation are described. Many wireless applications modulate a carrier frequency to wirelessly transmit data. However, when a distance between a transmitting wireless device and a receiving wireless device is changing (e.g., one or more of the transmitting device or receiving device is moving), a doppler shift may be introduced to a carrier signal. This doppler shift, when applied to a carrier signal, may be described as a CFO. The CFO can affect the quality of the data transmission, potentially leading to signal distortion or loss if not properly compensated for by the communication system. The CFO is typically compensated for through use of hardware dividers to adjust the frequency of a local oscillator to match the frequency shift of the shifted carrier signal in the receiving device. Additional clocks may also be used to provide a reference frequency between the shifted frequency and the local oscillator of the receiving device. However, hardware dividers and additional clocks may require more physical resources (e.g., silicon area) than desired and add unwanted complexity.

Aspects and embodiments of the present disclosure address the above problems or deficiencies by providing resampling logic that resamples, with a filter, incoming in-phase and quadrature (IQ) samples sampled at an input sampling rate and compensates for time drift error caused by the resampling with buffer management techniques. The filter may be a farrow filter that compensates for the CFO by converting incoming IQ samples, sampled at an incoming sampling rate, into outgoing IQ samples at an outgoing sampling rate. The time drift error may indicate alignment of the incoming sampling rate and the outgoing sampling rate. When the incoming sampling rate and the outgoing sampling rate are misaligned, the resampling logic may perform an operation to realign the samples, referred to herein as a realignment event.

The incoming and outgoing sampling rates may become misaligned when, in a period of time, a number of incoming IQ samples does not match (e.g., is not equal to) a number of outgoing IQ samples. Each time that the incoming and outgoing sampling rates become misaligned, the resampling logic performs a realignment event. A realignment event may be either a "skip" event or a "repeat" event, as described in more detail below.

A "skip" event occurs when, in a period of time, an additional outgoing IQ sample is generated before a next incoming IQ sample is received. A skip event may occur in response to the incoming sampling rate being lower than the outgoing sampling rate. To perform a skip event, the resampling logic may "skip" obtaining the next incoming IQ sample and use earlier-received incoming IQ sample(s) to generate a next outgoing IQ sample. In other words, the skip event may prevent a filter, such as a farrow filter, from ingesting the next incoming IQ sample. Here, the next outgoing IQ sample may be a duplicate (e.g., duplicate sample) of a previously-created outgoing IQ sample. A number of skip events to be performed within a period of time may be proportionally related to how much lower the incoming sampling rate is than the outgoing sampling rate.

A "repeat" event occurs when, in a period of time, an additional incoming IQ sample is received before a next outgoing IQ sample is generated. A repeat event may occur in response to the incoming sampling rate being higher than the outgoing sampling rate. To perform a repeat event, the resampling logic may overwrite a previously-created outgoing IQ sample with a current outgoing IQ sample. A repeat event effectively excludes the previously-created outgoing IQ sample by overwriting it with the current outgoing IQ sample. Here, the next outgoing IQ sample and the previously-created outgoing IQ sample may both correspond to the same most-recently received incoming IQ sample(s). A number of repeat events to be performed within the period of time may be proportionally related to how much higher the incoming sampling rate is than the outgoing sampling rate.

In various embodiments, a ratio may be used to determine the number of realignment events to occur within a period of time. The ratio may be related to incoming sampling rate and the outgoing sampling rate. In some embodiments, the ratio may be equal to the outgoing sampling rate divided by the incoming sampling rate. The ratio may be used to evenly distribute the realignment events within the period of time.

FIG. 1 illustrates a block diagram of a communication subsystem 100, including a modem 102, multiple digital beamforming (DBF) devices 104, multiple front-end integrated circuits (FEICs) 106, and multiple antenna elements 108 according to one embodiment. A receiving device or a transmitting device may include the communication subsystem 100. In embodiments where the communication subsystem 100 is part of a receiving device, the communication subsystem 100 may be designed to sample observed wireless signals into in-phase and quadrature (IQ) samples before the modem 102 (or other upstream portion of the receiving device) processes the IQ samples. The communication subsystem 100 may include an analog-to-digital converter (ADC) to generate the IQ samples representing the observed wireless signals. In some embodiments, the ADC samples the observed wireless signals to generate the IQ samples. In embodiments where the communication subsystem 100 is part of a transmitting device, the communication subsystem 100 may be configured to transmit data. The communication subsystem 100 may be within a wireless satellite communication environment.

In some embodiments, the modem 102 is coupled to a first DBF device 104(1) over a first SerDes link 114(1) (e.g., a first SerDes connection). The SerDes links can include one or more SerDes connections. The first DBF device 104 is coupled to a second DBF device 104(2) over a second SerDes link 114(2) (e.g., a second SerDes connection). The second DBF device 104(2) can be coupled to one or more additional DBF devices 104(N), where N is a positive integer, over one or more additional SerDes connections 114(N). While the described embodiment utilizes SerDes links, the SerDes links may be replaced with any other method of high-speed data transmission, such as parallel transmission, optical transmission, low-voltage differential signaling (LVDS), or pulse amplitude modulation (PAM). The specific choice of data transmission technique depends on the specific requirements of the given application (e.g., desired data rate, distance between communicating devices, power consumption). Each of the DBF devices 104 can be coupled to one or more FEICs 106. For example, the second DBF device 104(2) may be coupled to M number of FEICs 106(1)-106(M), where M is a positive integer. As an example, each DBF device 104 can be coupled to nine FEICs 106. The DBF devices 104 can be coupled to the FEIC 106 over a wired connection, such as a circuit board trace or a transmission line that is coupled between the DBF device 104 and the FEIC 106. Each of the FEICs 106 can be coupled to one or more antenna elements 108. For example, the first FEIC 106(1) can be coupled to four antenna elements 108(1)-108(4). The FEIC 106 can be coupled to the antenna element 108 over a wired connection, such as a circuit board trace or a transmission line between the FEIC 106 and the antenna element 108.

In the illustrated embodiment, the first DBF device 104(1) is considered to be a modem entry. A modem entry is a DBF device that connects to one or more modems of the panel. The modem entry is an ingress and egress for data signals and control signals to and from a modem to which it is connected (i.e., modem 102 in the illustrated embodiment). It should also be noted that FIG. 1 shows only two of the SerDes links of the first DBF device 104(1) and the second DBF device 104(2). Each of the DBF devices 104 can include more than two SerDes links. For example, the first DBF device 104(1) can include four SerDes links, a first SerDes link (e.g., bidirectional SerDes link) to connect to a first device (e.g., modem 102), a second SerDes link to connect to a second device (e.g., DBF device 104(2)), a third SerDes link to connect to a third device (e.g., a third DBF device not shown), and a fourth SerDes link to connect to a fourth device (e.g., a third DBF device not shown). The modem 102 and the DBF devices 104 can form a chain of DBF devices.

In one embodiment, a first set of antenna elements is coupled to a first radio frequency front-end (RFFE) circuit of a first set of RFFE circuits coupled to the first DBF device 104(1). A second set of antenna elements is coupled to a second RFFE circuit of the first set. A third set of antenna elements is coupled to a first RFFE circuit of the second set of RFFE circuits (e.g., FEIC 106(1)-(M)). It should be noted that in another embodiment, the DBF devices can couple directly to the antenna elements without the RFFE circuits. Some or all of the functionality of the set of RFFE circuits can be implemented in the DBF devices. The DBF devices 104 can be part of a RX panel. In the RX panel, the first DBF device 104(1) is configured to receive a first data stream from the first set of RFFE circuits, receive a second data stream from the second DBF device 104(2) over the second SerDes link 114(2), and send a combined data stream to the modem 102 over the first SerDes 114(1). The combined data stream includes at least a portion of the first data stream and at least a portion of the second data stream.

In another embodiment, the first DBF device 104(1) includes a digital signal processing (DSP) unit and a memory device coupled to the DSP unit. The DSP unit is configured to receive a first data stream from the first set of RFFE circuits, process the first data stream, and store the first data stream in the memory device. The DSP unit also receives a second data stream from the second DBF device 104(2) over the second SerDes link 114(2). The DSP unit combines, into a combined data stream, a portion of the first data stream and a portion of the second data stream, and outputs the combined data stream to the modem 102 over the first SerDes 114(1).

In at least the above embodiments, the first DBF device 104(1) may send the combined data stream to the modem 102 in the form of data packets. A data packet may include IQ samples. In some embodiments, the modem 102 comprises at least an electrical interface. The electrical interface may be an interface for any high-speed connection as described above.

In some embodiments, the communication subsystem 100 can be part of a receiving device of a communication system. In these embodiments, the first DBF device 104(1) is configured to receive a first data stream from the first set of RFFE circuits, receive a second data stream from the second DBF device 104(2) over the second SerDes link 114(2), and send a combined data stream to the modem 102 over the first SerDes 114(1). In some embodiments, the first set of RFFE circuits may include an ADC. In other embodiments, the second DBF device 104(2) may include an ADC. The combined data stream includes at least a portion of the first data stream and at least a portion of the second data stream. In other embodiments, the communication subsystem 100 can be part of a transmitting device of a communication system. In these embodiments, the first DBF device 104(1) is configured to receive a first data stream from the modem 102 over the first SerDes 114(1), send the first data stream to the second DBF device 104(2) over the second SerDes link 114(2), and send at least a portion of the first data stream to the first set of RFFE circuits.

In one embodiment, the modem 102 may include the resampling logic 110. In another embodiment, one or more DBF devices 104 may include the resampling logic 110. In another embodiment, the modem 102 and one or more DBF devices 104 may include at least a portion of the resampling logic 110. The resampling logic 110 can include hardware, software, firmware, or any combination thereof to resample IQ samples.

The resampling logic 110 may be designed to compensate for carrier frequency offset (CFO). The CFO may be quantified by a parts-per-million (PPM) number. Take, for instance, a scenario where a carrier signal is transmitted at 800 MHz but received at 808 MHz. The frequency discrepancy of 8 MHz in this case can be calculated as 10 PPM, using the formula $$10 \text{ PPM} = \frac{8 \text{ MHz}}{800 \text{ MHz}} \times 1{,}000{,}000.$$

Put another way, the carrier signal received in this example shows a variation of 10 PPM from the frequency at which it was transmitted. The CFO may be caused by a doppler shift or other factors such as oscillator inaccuracy, temperature variation, electrical component deterioration, power supply variations, or multipath propagation.

The resampling logic 110 may include a filter that is designed to compensate for an amount of CFO affecting a carrier signal by resampling incoming IQ samples into outgoing IQ samples. In embodiments where the communication subsystem 100 is located within a receiving device of a communication system, the incoming IQ samples may represent the carrier signal affected by CFO while the outgoing IQ samples may represent a frequency of the carrier signal without the affecting CFO. In some embodiments, the incoming IQ samples may have been generated by an ADC. As such, in these embodiments, an incoming sampling rate corresponding to the incoming IQ samples is related to the affecting CFO while an outgoing sampling rate corresponding to the outgoing IQ samples is related to the frequency of the carrier signal without the affecting CFO. In these embodiments, the incoming sampling rate may be the rate at which the incoming IQ samples were sampled while the outgoing sampling rate may be a sampling rate at which an upstream device processes the outgoing IQ samples, such as the modem 102 or other processing device.

In embodiments where the communication subsystem 100 is located within a transmitting device of a communication system, the outgoing IQ samples may be related to the affecting CFO while the incoming IQ samples may represent the frequency of the carrier signal without the affecting CFO. As such, in these embodiments, the outgoing sampling rate is related to the affecting CFO while the incoming sampling rate is related to the frequency of the carrier signal without the affecting CFO. In these embodiments, the incoming sampling rate may be the rate at an upstream device sampled the incoming IQ samples, such as a digital-to-analog converter (DAC), while the outgoing sampling rate may be a sampling rate by the communication subsystem 100 to generate a carrier signal with a frequency intended to mitigate or effectively eliminate the anticipated CFO.

In embodiments where the resampling logic 110 is located within one or more of the DBF devices 104, the incoming IQ samples may represent wireless signal(s) observed by respective antenna elements 108. In embodiments where the resampling logic 110 is located within the modem 102, the incoming IQ samples may be the IQ samples received from the DBF device 104(1).

In some embodiments, the filter of the resampling logic 110 is a Farrow filter. In at least some of these embodiments, the filter is an oversampled farrow filter. A Farrow filter is a type of digital filter that may be used for resampling discrete IQ samples. Farrow filters may resample incoming IQ samples by fractionally sampling IQ samples inputted into the farrow filter (e.g., incoming IQ samples) to create new IQ samples (e.g., outgoing IQ samples). A Farrow filter operates by applying a set of fixed-coefficient polynomial filters to the input signal, with the ability to adjust these coefficients dynamically, allowing for interpolation or decimation of the signal to achieve the desired sample rate. In at least one embodiment, a farrow filter utilizes the following equation to generate outgoing IQ samples:

$$X[n] = x[n + \mu] = \sum_{i=-2}^{i=1} h_k[i]x[n - i]$$

Equation (1)

Figure 7:
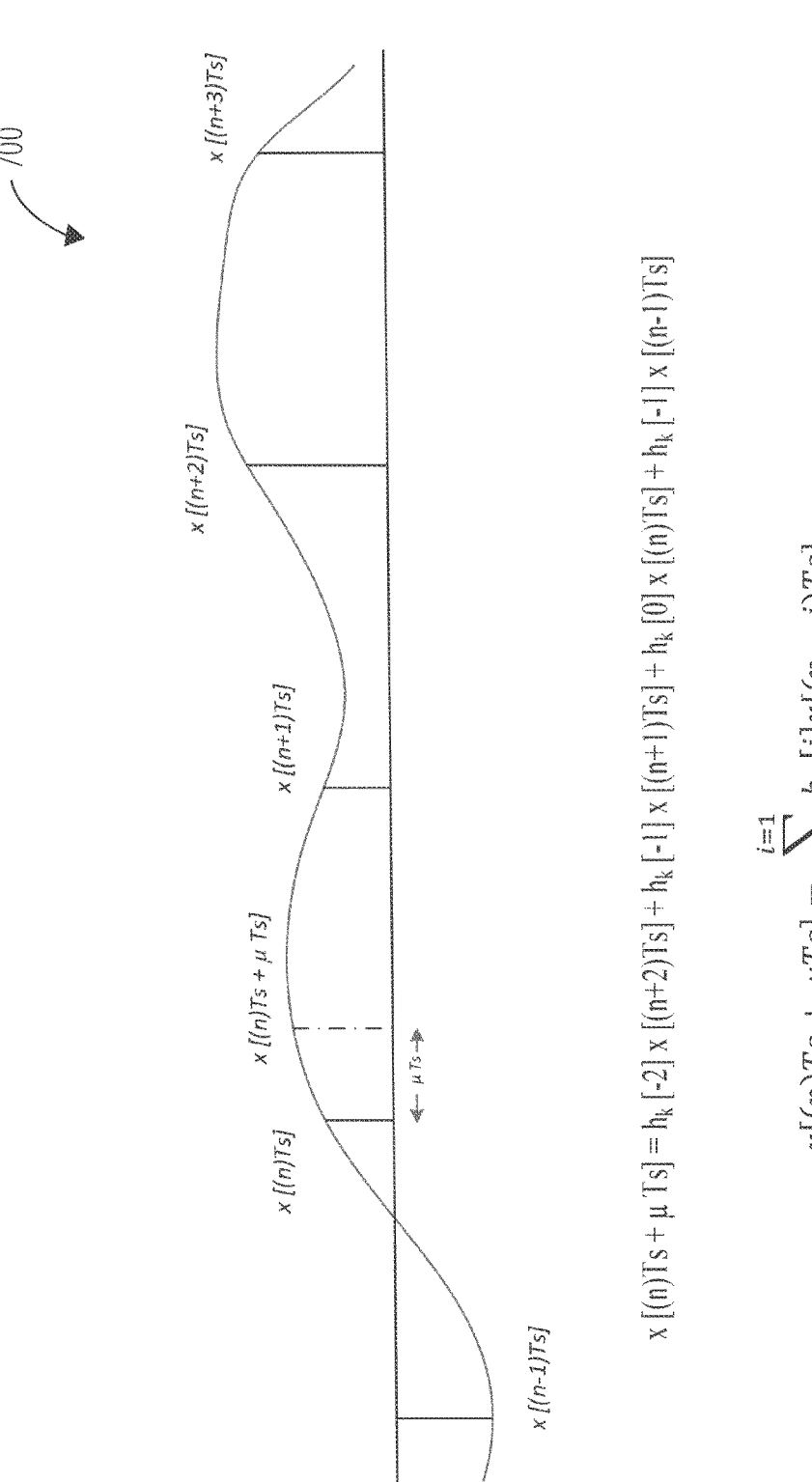
FIG. 7 is a graph illustrating a resampling of incoming in-phase and quadrature (IQ) samples into outgoing IQ samples, according to one embodiment.

Equation (1) may be representative of normal operation of the resampling logic 110. In some embodiments, equation (1) may also be described below as illustrated in FIG. 7. In equation (1), X[n] or x[n+μ] represents a current outgoing IQ sample generated by the filter, $h_k[i]$ represents filter coefficients, and x[n−i] represents incoming IQ samples. The letter n may represent a current index of the filter (i.e., current filter index). In some embodiments, a filter index corresponds to each of the incoming IQ samples. For example, x[n] may indicate a current incoming IQ sample, and x[n+1] may indicate a "next" incoming IQ sample in a queue to be become x[n]. In other words, x[n+1] may indicate a next incoming IQ sample. In some embodiments, multiple incoming IQ samples are used (e.g., x[n−1], x[n], x[n+1], x[n+2]) are used to generate one outgoing sample. In some embodiments, u may represent a current time drift error. The current time drift error may represent a fractional misalignment of a sample. For example, if the current time drift error is equal to 0.5, the current outgoing IQ sample X[n] may be indicate a location of a signal represented by the incoming IQ samples directly between incoming IQ samples x[n] and x[n+1] (e.g., x[n+0.5]). A current time drift error of zero ("0") may indicate that the current outgoing IQ sample X[n] and the current incoming IQ sample x[n] are perfectly aligned and that the current outgoing IQ sample X[n] is equal to the current incoming IQ sample x[n]. A current time drift error between zero ("0") and one ("1") may indicate a fractional misalignment, which may be compensated for by equation (1).

A current time drift error equal to or greater than one ("1") may indicate that the outgoing and incoming IQ samples are misaligned by at least one IQ sample. Similarly, a current time drift error less than zero ("0") may also indicate that the outgoing and incoming IQ samples are misaligned by at least one IQ sample. The at least one sample causing the misalignment may be either an incoming or outgoing IQ sample, depending on the incoming and outgoing sampling rates. In some embodiments, the resampling logic 110 may be designed to preemptively realign the incoming and outgoing sampling rates via one or more realignment events. The resampling logic 110 may perform an alignment event each time that the current time drift error is either (i) less than zero ("0") or (ii) equal to or greater than one ("1"). Each alignment event may be either a "skip event" or a "repeat event."

The resampling logic 110 may perform a skip event each time that the current time drift error is equal to or greater than one ("1"). With respect to equation (1), each skip event may effectively lower the current time drift error by 1.0. For example, if a skip event is performed by the resampling logic 110 when the current time drift error would equal 1.2, the current time drift error is modified to equal 0.2.

The resampling logic 110 may perform a repeat event each time that the current time drift error is less than zero ("0"). With respect to equation (1), each repeat event may effectively increase the current time drift error by 1.0. For example, if a repeat event is performed by the resampling logic 110 when the current time drift error would equal −0.2, the current time drift error is modified to equal 0.8.

In some embodiments, between realignment events, the current time drift error may linearly increase or decrease as the resampling logic 110 iteratively converts incoming IQ samples into outgoing IQ samples. In at least some of these embodiments, realignment events may occur at regular intervals. For a first example, if the current time drift error increased by 0.1 each time an outgoing IQ sample was generated, the current time drift error would increase by 1.0 on every tenth outgoing IQ sample generated by the resampling logic 110. So, for the first example, the resampling logic 110 may perform an alignment event at every tenth outgoing IQ sample generated. For a second example, if the time drift error increased by 0.4 each time an outgoing IQ sample was generated, the time drift error would reach a value of 1.2 after a third outgoing IQ sample is generated, at which time a first alignment event may be performed to lower the time drift error to 0.2. Then, after generating two more outgoing IQ samples, the time drift error may one ("1"), at which time a second alignment event may be performed to lower the time drift error to zero ("0").

The resampling logic 110 may use a sampling ratio to determine when alignment events are to be performed. In some embodiments, the sampling ratio may be calculated or estimated by comparing the incoming sampling rate to the outgoing sampling rate. In at least one embodiment, the resampling logic 110 may include circuitry (e.g., divider-less circuitry 600 of FIG. 6) to calculate the sampling ratio between an upsampling rate (e.g., "Q") and a downsampling rate (e.g., "P"). The upsampling rate and downsampling rate may have been determined by comparing the outgoing sampling rate to the incoming sampling rate. The upsampling rate being higher than the downsampling rate may indicate that the incoming sampling rate is lower than the outgoing sampling rate. Conversely, the upsampling rate being lower than the downsampling rate may indicate the incoming sampling rate is higher than the outgoing sampling rate. In some embodiments, one or more of the upsampling rate, the downsampling rate, or the sampling ratio is provided to the resampling logic 110 by another device, such as the DSP.

In some embodiments, to determine when alignment events are to be performed within the period of time, the resampling logic 110 may compare a first counter to a second counter. The first counter may represent the incoming sampling rate. In various embodiments, the first counter may be considered a first set of incrementing values. Each incrementing value of the first set of incrementing values may correspond to an index of the current incoming IQ sample. The second counter may represent the outgoing sampling rate. In various embodiments, the second counter may be considered a second set of incrementing values. Each incrementing values of the second set of incrementing values may correspond to an index of the current outgoing sample.

In some embodiments, the second set of incrementing values may be generated by multiplying the first set of incrementing values by the sampling ratio. The first and second sets of incrementing values (e.g., counters) may be concurrently incremented and compared after each concurrent increment. Each concurrent increment of the first and second count may represent an outgoing IQ sample generated by the resampling logic 110. A difference between the first and second counters may represent a total time drift error between the incoming sampling rate and the outgoing sampling rate. Each instance that the total time drift error between the first and second counters reaches an integer may represent a misalignment of incoming IQ samples and outgoing IQ samples. The total time drift error may reach an integer at periodic intervals. For example, if the sampling ratio is equal to 1.3 (e.g., the outgoing sampling rate is 30% higher than the incoming sampling rate, or 1.3 outgoing IQ samples are generated for each incoming IQ sample received by the resampling logic 110), the total time drift error may increment by 0.3 each time the first and second counters are concurrently incremented. This, in turn, may indicate that realignment events (here, skip events) are evenly spaced and should be performed once for every three ("3") or four ("4") outgoing IQ samples generated by the resampling logic 110. The following table (1) demonstrates how the difference between the counters may be used to determine when alignment events are to be performed, per this example:

TABLE 1

| First counter value | Second counter value | Total time drift error | Current time drift error |
|---|---|---|---|
| 1 | 1.3 | 0.3 | 0.3 |
| 2 | 2.6 | 0.6 | 0.6 |
| 3 | 3.9 | 0.9 | 0.9 |
| 4 | 5.2 | 1.2 | 1.2 ⇒ 0.2 |
| 5 | 6.5 | 1.5 | 0.5 |
| 6 | 7.8 | 1.8 | 0.8 |
| 7 | 9.1 | 2.1 | 1.1 ⇒ 0.1 |
| 8 | 10.4 | 2.4 | 0.4 |
| 9 | 11.7 | 2.7 | 0.7 |
| 10 | 13.0 | 3.0 | 1.0 ⇒ 0.0 |
| 11 | 14.3 | 3.3 | 0.3 |
| 12 | 14.6 | 3.6 | 0.6 |

As illustrated in table (1), if the sampling ratio is equal to 1.3, the total time drift error increments by 0.3 each time that the first and second counters are incremented. At a fourth concurrent increment, the total time drift error reaches an integer (i.e., 1.0) and is equal to 1.2, which is greater than 1.0, which may indicate a misalignment between incoming and outgoing IQ samples at a fourth-generated outgoing IQ sample. In this case, the resampling logic 110 may not have received an incoming sample aligned with the fourth-generated outgoing IQ sample. As such, a first skip event may be performed in relation to the fourth-generated outgoing IQ sample. In response to the first skip event, the current time drift error may be reduced from 1.2 to a fractional misalignment of 0.2. At a seventh concurrent increment, the total time drift error reaches another integer (i.e., 2.0) and is equal to 2.1, which indicates that the current time drift error is equal to 1.1, which indicates another misalignment at the seventh-generated outgoing IQ sample similar to the misalignment indicated by the fourth concurrent increment. A second skip event may be performed in relation to the seventh-generated outgoing IQ sample, which may reduce the current time drift error from 1.1 to a fractional misalignment 0.1. At a tenth concurrent increment, the total time drift error reaches another integer (i.e., 3.0) and is equal to 3.0, which indicates a misalignment similar to the misalignments indicated by the fourth and seventh concurrent increments. A third skip event may be performed in relation to the ten-generated outgoing IQ sample, which may reduce the current time drift error from 1.0 to 0.0 (i.e., no fractional misalignment).

Each generated outgoing IQ sample may correspond to a filter index. The filter indices corresponding to generated outgoing IQ samples may sequentially increment as each outgoing IQ sample is generated. For example, the fourth-generated IQ sample may correspond to a filter index of four ("4"), while a seventh-generated IQ sample may correspond to a filter index of seven ("7"). In this example, filter indices of four ("4"), seven ("7"), and ten ("10") may each correspond to a skip event.

As another example, consider a sampling ratio of 0.85 (e.g., the outgoing sampling rate is 15% lower than the incoming sampling rate, or 0.85 outgoing IQ samples are generated for each incoming IQ sample received by the resampling logic 110). The total time drift error may increment by 0.4 each time that the first and second counters are incremented. This, in turn, may indicate that realignment events (here, repeat events) are evenly spaced and should be performed once for every six ("6") or seven ("7") outgoing IQ samples generated by the resampling logic 110. The following table (2) demonstrates how the difference between the counters may be used to determine when alignment events are to be performed, per this example:

TABLE 2

| First counter value | Second counter value | Total time drift error | Current time drift error |
|---|---|---|---|
| 1 | 0.85 | 0.15 | −0.15 ⇒ 0.85 |
| 2 | 1.70 | 0.3 | 0.7 |
| 3 | 2.55 | 0.45 | 0.55 |
| 4 | 3.4 | 0.6 | 0.40 |
| 5 | 4.25 | 0.75 | 0.25 |
| 6 | 5.1 | 0.9 | 0.10 |
| 7 | 5.95 | 1.05 | −0.05 ⇒ 0.95 |
| 8 | 6.8 | 1.2 | 0.80 |
| 9 | 7.65 | 1.35 | 0.65 |
| 10 | 8.5 | 1.5 | 0.50 |
| 11 | 9.35 | 1.65 | 0.35 |
| 12 | 10.2 | 1.8 | 0.2 |
| 13 | 11.05 | 1.95 | 0.05 |
| 14 | 11.90 | 2.10 | −0.10 ⇒ 0.9 |
| 15 | 12.75 | 2.25 | 0.75 |

As illustrated in table (2), if the sampling ratio is equal to 0.85, the total time drift error increments by 0.15 each time that the first and second counters are incremented. After the first increment (i.e., the first counter value equals 1 and the second counter value equals 0.85), the current time drift error may be equal to −0.15, which may indicate a misalignment (i.e., less than zero) between incoming and outgoing IQ samples at a first-generated outgoing IQ sample. In this case, the resampling logic 110 may have received an extra incoming IQ sample that is not aligned with an outgoing IQ sample. As such, a first repeat event may be performed in relation to the first-generated outgoing IQ sample. In response to the first repeat event, the current time drift error may be increased from −0.15 to a fractional misalignment of 0.85. At a seventh concurrent increment, the total time drift error reaches an integer (i.e., 1.0) and is equal to 1.05, which indicates that the current time drift error is equal to −0.05, which indicates another misalignment at a seventh-generated outgoing IQ sample similar to the misalignment indicated by the first concurrent increment. A second repeat event may be performed in relation to the seventh-generated outgoing IQ sample, which may increase the current time drift error from −0.05 to a fractional misalignment 0.95. At a fourteenth concurrent increment, the total time drift error reaches another integer (i.e., 2.0) and is equal to 2.10, which indicates that the current time drift error is equal to −0.10, which indicates another misalignment at the fourteenth-generated outgoing IQ sample similar to the misalignment indicated by the first and seventh concurrent increments. A third repeat event may be performed in relation to the fourteenth-generated outgoing IQ sample, which may increase the current time drift error from −0.10 to a fractional misalignment 0.9. In this example, filter indices of one ("1"), seven ("7"), and fourteen ("14") may each correspond to a repeat event.

The resampling logic 110 may use the first and second counters to determine a subset of outgoing IQ samples in relation to which realignment events should be performed. A set of outgoing IQ samples may include the subset of outgoing IQ samples. The set of outgoing IQ samples may include each outgoing IQ sample that the resampling logic 110 generates within a period of time. The period of time may be a time transmission interval (TTI). For example, if a total of one million outgoing IQ samples may be generated within the TTI, and the sampling ratio was equal to 10 PPM, the total time drift error may reach an integer at intervals of 100,000 samples. As such, a realignment event may occur every 100,000 samples within the TTI. In other words, realignment events within a TTI may be evenly distributed along the TTI. If the sampling ratio for a TTI is not equal to one (e.g., the upsampling rate is different than the downsampling rate, or the outgoing sampling rate is different than the incoming sampling rate), at least one realignment event may be performed by the resampling logic 110 within the TTI.

In some embodiments, a realignment event may be either a "skip event" or a "repeat event." In some embodiments, a skip event and a repeat event may not be performed within one TTI. A sampling ratio less than one may indicate that the realignment event is a skip event. A sampling ratio less than one may indicate that the incoming sampling rate is lower than the outgoing sampling rate. In other words, a sampling ratio less than one may indicate that the resampling logic 110 is to generate more outgoing IQ samples than received incoming IQ samples. During a skip event, an additional outgoing IQ sample may be generated before a new incoming IQ sample is received. To perform a skip event, the resampling logic may "skip" obtaining the new incoming IQ sample and use earlier-received incoming IQ sample(s) to generate a next outgoing IQ sample. To reference equation (1), the resampling logic 110 may perform a skip event by incrementing n of the outgoing IQ sample X[n] without incrementing n of the incoming IQ samples x[n−i]. In other words, the resampling logic 110 may prevent a filter such as a farrow filter (e.g., doppler filter logic 230 of FIG. 2) from ingesting an incoming IQ sample to be used in generating an outgoing IQ sample. As a result, the next outgoing IQ sample may be a duplicate of a previously-created outgoing IQ sample. For example, a skip event may cause a next outgoing IQ sample X[n+1] to be a duplicate of the current outgoing IQ sample X[n] of equation (1). Below is an equation (2) illustrating a skip event, according to one embodiment:

$$X[n+1] = \sum_{i=-2}^{i=1} h_k[i]x[n-i]$$

Equation (2)

The resampling logic 110 may perform a skip event by preventing a read pointer from updating. The read pointer may point to incoming IQ samples stored in an input buffer (e.g., input buffer 220 of FIG. 2). The read pointer may periodically update or increment to point at a next incoming IQ sample stored in the input buffer. During a skip event, the resampling logic 110 may temporarily prevent the read pointer from updating or incrementing. The resampling logic 110 may prevent the read pointer from updating or incrementing long enough to allow a single outgoing IQ sample to be generated. As an example of a skip event, consider a table (4) as shown below:

As described in table (4), the outgoing IQ samples X[n] and X[n+2] may have been generated during normal operation of the resampling logic 110. However, the outgoing IQ sample X[n+1] is generated during a skip event. In other words, in this example, a filter index of [1] or [2] may correspond to a skip event. As a result, the incoming IQ samples used to generate X[n+1] are the same as the incoming IQ samples used to generate X[n], which may result in X[n+1] being a duplicate of X[n].

A sampling ratio greater than one may indicate that the realignment event is a repeat event. A sampling ratio greater than one may indicate that the incoming sampling rate is higher than the outgoing sampling rate. In other words, a sampling ratio greater than one may indicate that the resampling logic 110 is to generate less outgoing IQ samples than received incoming IQ samples. During a repeat event, an additional incoming IQ sample may be received before a next incoming IQ sample is to be generated. To perform a repeat event, the resampling logic 110 may overwrite a previously-created outgoing IQ sample with a next outgoing IQ sample. By overwriting the previously-created outgoing IQ sample, the resampling logic effectively excludes the previously-created outgoing IQ samples from the outgoing IQ samples stored in an output buffer (e.g., output buffer 240 of FIG. 2). To reference equation (1), the resampling logic 110 may perform a repeat event by incrementing n of the incoming IQ samples x[n−i] without incrementing n of the outgoing IQ sample X[n]. Below is an equation (3) illustrating a repeat event, according to one embodiment:

$$X[n] = \sum_{i=-3}^{i=0} h_k[i]x[n-i]$$

Equation (3)

The resampling logic 110 may perform a repeat event by preventing a write pointer from updating. The write pointer may point to locations within the output buffer where the current outgoing IQ sample is to be stored. The write pointer may be periodically updated or incremented to point at a next location or address to store a next outgoing IQ sample. During a repeat event, the resampling logic 110 may temporarily prevent the read pointer from updating or incrementing. The resampling logic 110 may prevent the write pointer from updating or incrementing long enough to allow a single outgoing IQ sample to be generated. As an example of a skip event, consider a table (4) as shown below:

TABLE 3

| Filter index | Generated outgoing IQ sample | Incoming IQ samples used to generate outgoing IQ sample | | | |
|---|---|---|---|---|---|
| [1] | X[n] | x[n − 2] | x[n − 1] | x[n] | x[n + 1] |
| [2] | X[n + 1] | x[n − 2] | x[n − 1] | x[n] | x[n + 1] |
| [3] | X[n + 2] | x[n − 1] | x[n] | x[n + 1] | x[n + 2] |

TABLE 4

| Filter Index | Generated outgoing IQ sample | Incoming IQ samples used to generate outgoing IQ sample | | | |
|---|---|---|---|---|---|
| [1] | X[n − 1] | x[n − 2] | x[n − 1] | x[n] | x[n + 1] |
| [2] | X[n] | x[n − 1] | x[n] | x[n + 1] | x[n + 2] |
| [3] | X[n] | x[n] | x[n + 1] | x[n + 2] | x[n + 3] |
| [4] | X[n + 1] | x[n + 1] | x[n + 2] | x[n + 3] | x[n + 4] |

As described in table (4), the outgoing IQ samples X[n−1] and X[n+1] may have been generated during normal operation of the resampling logic 110. However, the outgoing IQ sample X[n] may have been generated during a repeat event. In other words, in this example, a filter index of [2] or [3] may correspond to a repeat event. As a result, though incoming IQ samples x[n−1], x[n], x[n+1], and x[n+2] may have been used to generate X[n] during normal operation at filter index [2], incoming samples x[n], x[n+1], x[n+2], x[n+3] are used to overwrite X[n] at filter index [3].

In some embodiments, the resampling logic 110 may compensate for the CFO at a receiving device of a wireless communication system. For example, consider an embodiment where the communication subsystem 100 is within a receiving device of a wireless communication system. The communication subsystem 100 may produce incoming IQ samples in response to receiving an incoming carrier signal. A phase-locked loop (PLL) or a similar mechanism may dictate the incoming sampling rate to be proportional to a frequency of the incoming carrier signals. The PLL or similar mechanism may be part of an ADC designed to generate incoming IQ samples representing the incoming carrier signal. The ADC may generate incoming IQ samples at the incoming sample rate dictated by the PLL or similar mechanism. If the frequency of the incoming carrier signal includes a CFO, and thus is offset from the outgoing carrier signal frequency, then the incoming sampling rate is also be offset from the outgoing sampling rate. To compensate for the CFO and offset incoming sampling rate, the resampling logic 110 may utilize a filter, such as a farrow filter, designed to mitigate or eliminate the CFO and resample the incoming IQ samples at the outgoing sampling rate.

In embodiments where the communication subsystem 100 is part of a receiving device of a communication system, the outgoing sampling rate may be constant while the incoming sampling rate may be outgoing. The incoming sampling rate may be dependent on a dynamic rate of change of the distance between the receiving device and a transmitting device of the communication system (e.g., a satellite approaching and receding from a ground station, or a doppler shift). The CFO may represent this dynamic rate of change. This dynamic rate of change may correspond to the CFO. In these embodiments, the filter may be designed to generate the outgoing IQ samples at the constant outgoing sampling rate. The filter may include different sets of coefficients that may be used to generate the outgoing IQ samples. Each of the different sets of coefficients may correspond to a different incoming sampling rate.

In some embodiments, the resampling logic 110 may compensate for the CFO at a transmitting device of a wireless communication system. For example, consider an embodiment where the communication subsystem 100 is within a transmitter device of a wireless communication system. The communication subsystem 100 may produce incoming IQ samples in response to receiving data to wirelessly communicate to a receiving device of the wireless communication system. The communication subsystem 100 may have an estimated CFO that will affect the carrier signal after being transmitted. The communication subsystem 100 may preemptively cause the resampling logic 110 to resample the incoming IQ samples into outgoing IQ samples representing a frequency that compensates for the estimated CFO. The outgoing samples may then be transmitted at the compensating frequency.

In embodiments where the communication subsystem 100 is part of a transmitting device of a communication system, the incoming sampling rate may be constant while the outgoing sampling rate may be outgoing. The outgoing sampling rate may be outgoing to compensate for a dynamic rate of change of the distance between the receiving device and a transmitting device of the communication system (e.g., a satellite approaching and receding from a ground station). The CFO may represent this dynamic rate of change. In these embodiments, the filter may be designed to generate the outgoing IQ samples at the outgoing sampling rate. The filter may include different sets of coefficients that may be used to generate the outgoing IQ samples. Each of the different sets of coefficients may correspond to a different outgoing sampling rate.

Figure 2:
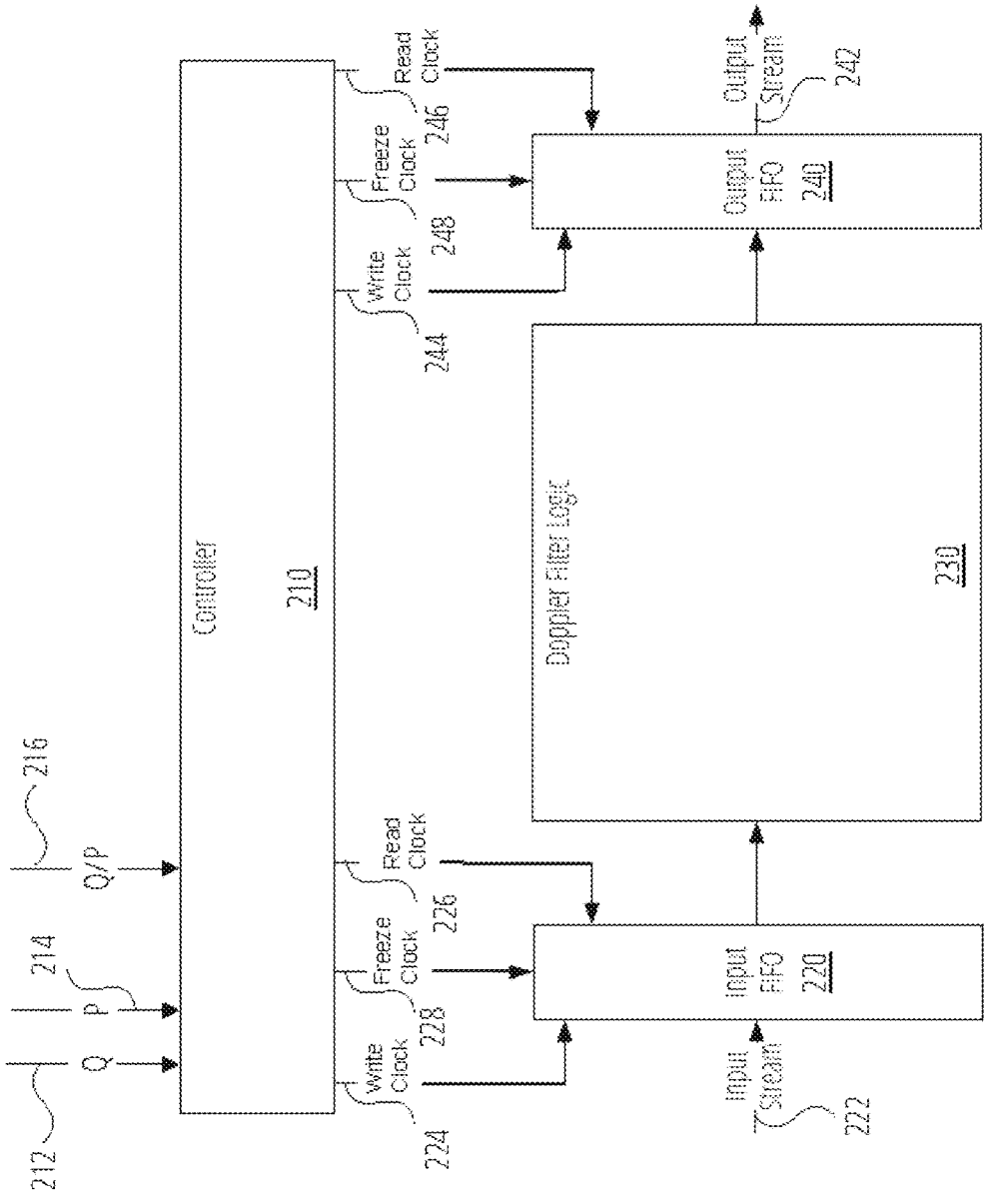
FIG. 2 illustrates resampling logic including a controller, an input buffer, doppler filter logic, and an output buffer, according to one embodiment.

FIG. 2 illustrates resampling logic 110 including a controller 210, an input buffer 220, doppler filter logic 230, and an output buffer 240, according to one embodiment. In some embodiments, the controller 210 receives an upsampling rate 212, a downsampling rate 214, and a sampling ratio 216 from another device, such as a DSP. In some embodiments, the controller 210 may receive the sampling ratio 216 from other circuitry, such as the divider-less circuitry 600 as described below in FIG. 6. In at least one embodiment, the controller 210 only receives the sampling ratio 216 (and not the upsampling rate 212 or downsampling rate 214) from either a device such as a DSP or other circuitry.

In various embodiments, the input buffer 220 is a first-in-first-out (FIFO) buffer. The input buffer 220 may receive and store incoming samples of an input data stream 222. In embodiments where the resampling logic 110 is located within a receiving device of a communication system, the input data stream 222 may be generated by RF front-end (RFFE) circuitry. The RFFE circuitry may include an analog-to-digital converter that converts, by sampling, observed RF signal(s) into incoming IQ samples. In embodiments where the resampling logic 110 is located within a transmitting device of a communication system, the input data stream 222 may be generated by upstream circuitry, such as a signal generator or a waveform generator.

An input write pointer may point to a location in the input buffer 220 that a next incoming IQ sample of the input data stream 222 is to be stored. The input write pointer may be updated or incremented to point to a next location or address of the input buffer 220 upon each clock cycle of an input write clock 224 of the controller 210. The input buffer 220 may be coupled to the doppler filter logic 230. Incoming IQ samples stored in the input buffer 220 may be sent to the doppler filter logic 230 to generate outgoing IQ samples. In some embodiments, the incoming IQ samples stored in the input buffer 220 may be read by the doppler filter logic 230 using an input read pointer. In some embodiments, the input read pointer may point to a current incoming IQ sample to be used by the doppler filter logic 230 to generate a current outgoing IQ sample. In other embodiments, the input read pointer may point to an earliest-received incoming IQ sample of a group of incoming IQ samples to be used by the doppler filter logic 230 to generate the current outgoing IQ sample (e.g., x[n−1] in reference to equation (1)). The input read pointer may update or increment upon each clock cycle of an input read clock 226 of the controller 210. Intervening circuitry may couple the input buffer 220 to the doppler filter logic 230, such as a circular buffer (e.g., circular buffer 320 of FIG. 3).

The doppler filter logic 230 may be coupled to the output buffer 240 with or without intervening circuitry. In some embodiment, an output write pointer may point to a location in the output buffer 240 that the current outgoing IQ sample (e.g., an outgoing IQ sample most recently generated by the doppler filter logic 230) is to be stored. Outgoing IQ samples generated by the doppler filter logic 230 and thereafter sent to the output buffer may be considered an outgoing data stream. The doppler filter logic 230 may use the output write pointer to identify the location to store the current outgoing IQ sample. The output write pointer may update or increment to point to a next location of the output buffer 240 upon each clock cycle of an output write clock 244 of the controller 210. In some embodiments, the output write clock 244 and the input read clock 226 may be a same clock. In at least some of these embodiments, the output write clock 244, the input read clock 226, and the output read clock 246 may be a same clock. Outgoing IQ samples stored in the output buffer 240 may be outputted via an output stream. In embodiments where the resampling logic 110 is located within a receiving device of a communication system, the output buffer 240 may output stored outgoing IQ samples to upstream circuitry, such as modem. In at least some of these embodiments, the outgoing IQ samples stored in the output buffer 240 may be read by the upstream circuitry using an output read pointer. The output read pointer may update or increment upon each clock cycle of an output read clock 246 of the controller 210. In embodiments where the resampling logic 110 is located within a transmitting device of a communication system, the output buffer 240 may output stored outgoing IQ samples to downstream circuitry, such as a digital-to-analog converter (DAC) or other RFFE circuitry. In at least some of these embodiments, the outgoing IQ samples stored in the output buffer 240 may be read by the downstream circuitry using the output read pointer.

As described above with respect to FIG. 1, the resampling logic 110 may receive incoming IQ samples sampled at an incoming sampling rate. The resampling logic 110 may receive the incoming IQ samples via the input data stream 222. The input buffer 220 may store the incoming IQ samples via the input data stream 222. In embodiments where the resampling logic 110 is located within a receiving device of a communication system, a phase-locked loop (PLL) or a similar mechanism may control the incoming sampling rate dependent on frequency(ies) of observed carrier signal(s). As such, the incoming sampling rate may be dependent on an amount of carrier frequency offset (CFO) affecting the observed carrier signal(s). In embodiments where the resampling logic 110 is located within a transmitting device of a communication system, the incoming sampling rate may be constant and predetermined.

As described above with respect to FIG. 1, the resampling logic 110 may output outgoing IQ samples at an outgoing sampling rate. The resampling logic 110 may output outgoing IQ samples stored by the output buffer 240 via the output stream 242. In embodiments where the resampling logic 110 is located within a receiving device of a communication system, the outgoing sampling rate may be constant and predetermined. In embodiments where the resampling logic 110 is located within a transmitting device of a communication system, the outgoing sampling rate may be dependent on an anticipated amount of CFO affecting the carrier signal. In at least some of these embodiments, the outgoing signal may be inversely proportional to the anticipated amount of CFO in order to reduce or effectively eliminate the anticipated amount of CFO.

As described above with respect to FIG. 1, the resampling logic 110 may perform a realignment event each time a misalignment exists between the incoming IQ samples and the outgoing IQ samples. If the sampling ratio indicates that the incoming sampling rate is lower than the outgoing sampling rate (e.g., the sampling ratio is greater than one), the resampling logic 110 may perform one or more skip events. If the sampling ratio indicates the incoming sampling rate is higher than the outgoing sampling rate (e.g., the sampling ratio is less than one), the resampling logic 110 may perform one or more repeat events.

Each misalignment may correspond to a filter index. Each filter index may correspond to an outgoing IQ sample generated by the doppler filter logic 230. The outgoing IQ samples may be sequentially indexed according to an order of which the outgoing IQ samples were generated.

In some embodiments, a skip event may include preventing the input read pointer from updating or incrementing. To prevent the input read pointer from updating or incrementing, the controller 210 may send an input freeze clock 228 to the input buffer 220. In some embodiments, the input freeze clock 228 may mask the input read clock 226 to prevent the input read pointer from incrementing upon a clock cycle of the input read clock 226. In other embodiments, other techniques may be used to prevent the read input pointer from updating or incrementing. In some embodiments, the input freeze clock 228 is a gated clock, as described in FIGS. 4A-B. The input freeze clock 228 may be enabled for each instance that an outgoing IQ sample is to be generated without a corresponding incoming IQ sample. In some embodiments, the input freeze clock 228 may only be enabled long enough for the doppler filter logic 230 to generate a single outgoing IQ sample.

In response to the controller 210 enabling the input freeze clock 228 to prevent the input read pointer from updating or incrementing, incoming IQ sample(s) used by the doppler filter logic 230 to generate the current outgoing IQ sample (e.g., X[n]) may be identical to incoming IQ sample(s) used to generate a most-recently generated outgoing IQ sample (e.g., X[n−1]). In other words, a current outgoing IQ sample generated directly after the controller 210 enables the input freeze clock 228, the doppler filter logic 230 may generate a duplicate outgoing IQ sample.

In some embodiments, a repeat event may include preventing the output write pointer from updating or incrementing. To prevent the output write pointer from updating or incrementing, the controller 210 may send an output freeze clock 248 to the output buffer 240. In some embodiments, the output freeze clock 248 may mask the output write clock 244 to prevent the output write pointer from incrementing upon a clock cycle of the output read clock 246. In other embodiments, other techniques may be used to prevent the write output pointer from updating or incrementing. In some embodiments, the output freeze clock 248 is a gated clock, as described in FIGS. 4A-B. The output freeze clock 248 may be enabled for each instance that an additional incoming IQ sample that does not correspond to a current outgoing IQ sample (e.g., X[n]) is a current incoming IQ sample (e.g., x[n]). In some embodiments, the output freeze clock 248 may only be enabled long enough for the doppler filter logic 230 to generate a single outgoing IQ sample.

In response to the controller 210 enabling the output freeze clock 248 to prevent the output write pointer from updating or incrementing, a most-recently generated outgoing IQ sample (e.g., X[n−1]) may be overwritten by a current IQ sample (e.g., X[n]). The most-recently generated outgoing IQ sample may have been generated by the doppler filter logic 230 while the additional incoming IQ sample was the current incoming IQ sample. In other words, the controller 210 excludes the most-recently generated outgoing IQ sample by enabling the input freeze clock 228, which causes the current outgoing IQ sample to overwrite the most-recently generated outgoing IQ sample.

Figure 3:
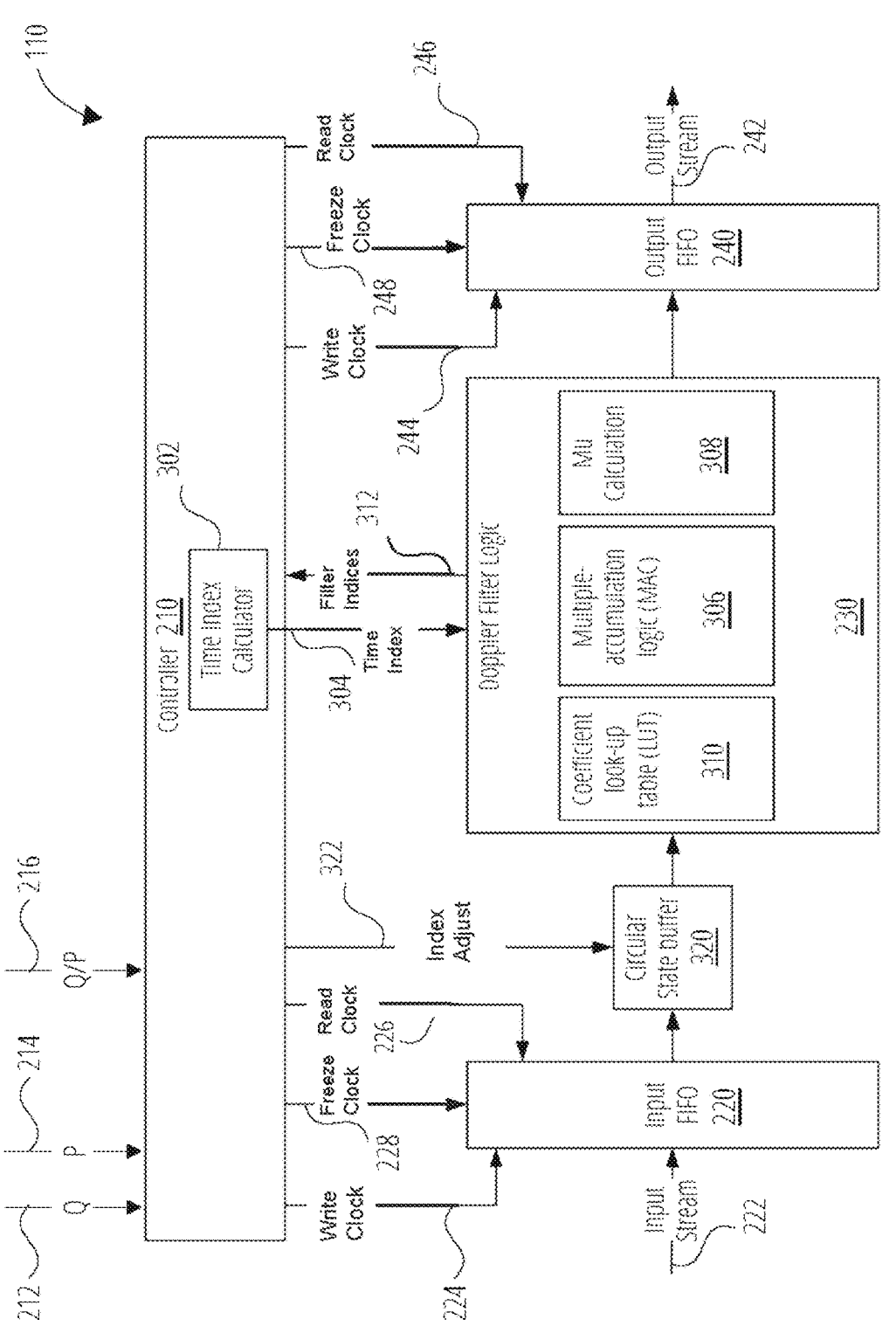
FIG. 3 illustrates resampling logic including a controller, an input buffer, a circular buffer, doppler filter logic, and an output buffer, according to one embodiment.

FIG. 3 illustrates resampling logic 110 including a controller 210, an input buffer 220, a circular buffer 320, doppler filter logic 230, and an output buffer 240, according to one embodiment. In some embodiments, the controller 210 may include a time index calculator 302. The time index calculator 302 may provide a time index 304 to the doppler filter logic 230. The filter indices 312 may include one or more filter indices. In at least one embodiment, one or more filter indices 312 sent to the controller 210 within a period of time (e.g., TTI) may each correspond to a misalignment event. The misalignment event(s) may be as described above with respect to FIGS. 1-2. Each filter index may also correspond to an outgoing IQ sample generated by the doppler filter logic 230. The outgoing IQ samples may be sequentially indexed according to an order of which the outgoing IQ samples were generated.

In at least one embodiment, the time index calculator 302 may calculate the time index may based on one or more filter indices 312 provided by the doppler filter logic 230. The controller 210 may compare the calculated time index against a predetermined subset of filter indices that each correspond to a misalignment between the incoming IQ samples and the outgoing IQ samples. These predetermined filter indices may have been determined in a manner similar to what was described above with respect to FIG. 1.

The controller 210 may include a time index calculator 302 that adjusts the time index 304 to account for skip and repeat events. Each time index 304 may correspond to an outgoing IQ sample. Each time index 304 may be provided to the output buffer 240 along with the corresponding outgoing IQ sample. In some embodiments, outgoing IQ samples may be provided via the output stream 242 along with a corresponding time index.

The resampling logic 110 may include a circular buffer 320. The circular buffer 320 may have a length corresponding to a number of incoming IQ samples used by the doppler filter logic 230 to generate a single outgoing IQ sample. For example, if the doppler filter logic 230 uses sixteen incoming samples to generate one outgoing IQ sample, the circular buffer 320 may have sixteen total buffer addresses. In reference to equation (1), if the doppler filter logic 230 uses four incoming samples to generate one outgoing IQ sample, the circular buffer 320 may have four total buffer addresses. An index adjust pointer 322 may point to an oldest incoming IQ sample (e.g., an earliest-received incoming IQ sample) within the circular buffer 320. The circular buffer 320 may provide each stored incoming IQ sample to the doppler filter logic 230 in an order of which they were received. For example, with reference to equation (1), the circular buffer 320 may provide the incoming IQ samples in the following order: x[n−1], x[n], x[n+1], x[n+2].

After the circular buffer 320 has provided the stored IQ samples to the doppler filter logic 230, the input buffer 220 may provide the circular buffer 320 with newest incoming IQ sample. The newest incoming IQ sample may overwrite the oldest incoming IQ sample. After the newest incoming IQ sample overwrites the oldest incoming IQ sample, the index adjust pointer 322 may increment or update to a next-oldest incoming IQ sample stored in the circular buffer 320. In some embodiments, this process of the circular buffer 320 described may be iteratively performed.

In some embodiments, during a skip event, a newest incoming IQ sample may not be provided to the circular buffer 320 and the index adjust pointer 322 may not increment. In other words, the controller 210 may prevent the doppler filter logic 230 from ingesting the newest incoming IQ sample during a skip event. In these embodiments, the doppler filter logic 230 may generate a duplicate outgoing IQ sample because the incoming IQ samples stored by the circular buffer 320 did not change.

In some embodiments, the doppler filter logic 230 may include a coefficient look-up table (LUT) 310. The coefficient LUT 310 may include multiple sets of coefficients each designed to resample IQ samples between different frequencies. For example, a first set of coefficients may be designed to resample incoming IQ samples sampled at 808 MHz to outgoing IQ samples at 800 MHZ. A second set of coefficients may be designed to resample incoming IQ samples sampled at 790 MHz to outgoing IQ samples at 800 MHZ. The coefficient LUT 310 may allow the doppler filter logic 230.

In some embodiments, the doppler filter logic 230 may include multiply-accumulation (MAC) logic 306. The MAC logic 306 may be implemented as a farrow lattice structure. The MAC logic 306 may be designed to perform sequential multiplication and accumulation operations between incoming IQ samples and a set of coefficients of the coefficient LUT 310. In some embodiments, the lattice configuration of the MAC logic 306 may facilitate concurrent processing of multiple data streams, enhancing computational efficiency and throughput of the doppler filter logic 230.

In some embodiments, the doppler filter logic 230 may include time drift error calculation logic 308. The time drift error calculation logic 308 may determine, in real time, a current fractional misalignment between a current incoming IQ sample (e.g., x[n]) and a current outgoing IQ sample (e.g., X[n]). In some embodiments, the time drift error calculation logic 308 may determine the current fractional misalignment using one or more filter indices 312 or the time index 304.

Figure 4A:
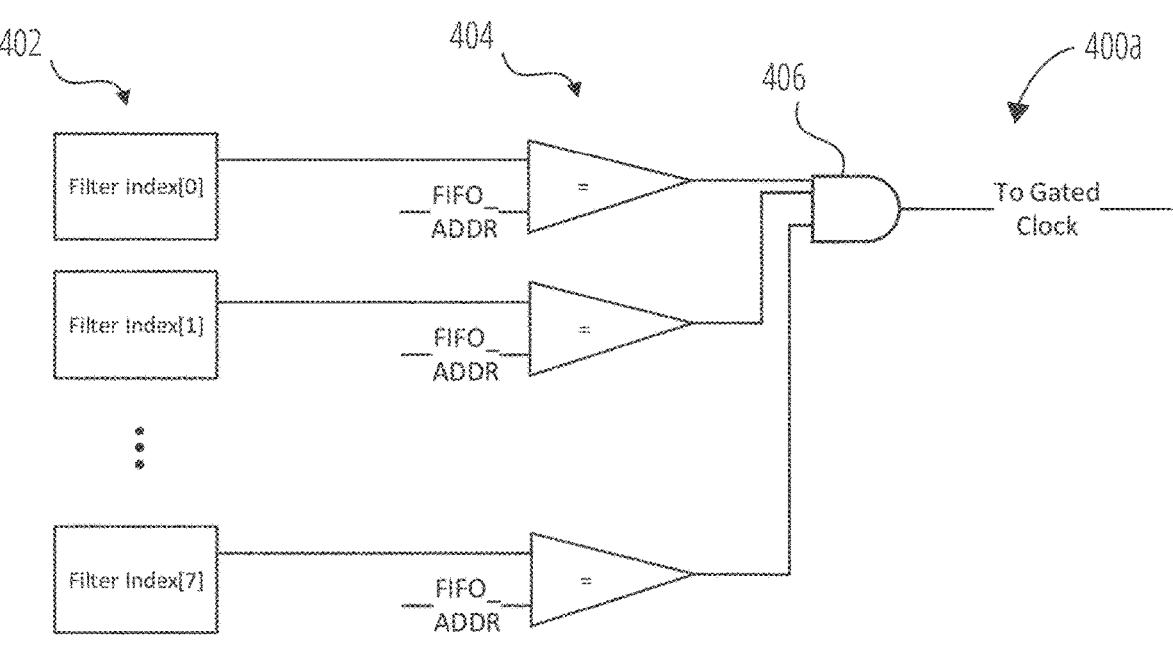
FIG. 4A illustrates gating logic for a freeze clock, according to one embodiment.

FIG. 4A illustrates gating logic 400a for a freeze clock, such as the input freeze clock 228 or output freeze clock 248, according to one embodiment. The gating logic 400a can be software, hardware, firmware, or any combination thereof. In some embodiments, the gating logic 400a may be part of a controller, such as the controller 210 as described in FIGS. 2-3. In some embodiments, the gating logic includes one or more registers 402 to store one or more filter indices. Each filter index stored by a register 402 may correspond to a misalignment event (e.g., a skip event or repeat event). The filter index (ices) stored by register(s) 402 may have been determined in a manner similar to what is described above with respect to FIGS. 1-3.

Each register 402 may be coupled to comparison logic 404. In various embodiments, the registers 402 may each provide a specific buffer address to the comparison logic 404. In one embodiment, the comparison logic 404 may compare most-recently-received filter index(es) (e.g., a current address of a buffer) to the specific buffer addresses stored by the registers 402. In another embodiment, the comparison logic 404 may compare a most-recently-calculated time index to the specific buffer addresses stored by the registers 402. In at least one embodiment, the current address of the buffer may be indicated by the input read pointer as described above with respect to FIG. 2. In some embodiments, the current address buffer may be buffer addresses corresponding to one or more of the filter indices 312 sent to the controller 210, as described above with respect to FIG. 3. In at least one embodiment, the current address buffer may be indicated by the output write buffer as described above with respect to FIG. 2. If the current buffer address matches a filter index stored by a register 402, a signal may be sent from the comparison logic 404 to a logic gate 406. The logic gate 406 may an input for each respective register 402, as illustrated. The logic gate 406 may output a signal each time that the current buffer address matches one of the filter indices stored by the registers 402. The signal outputted by the logic gate 406 may enable a gated clock. In some embodiments, the signal outputted by the logic gate 406 may be sent to a latch.

Figure 4B:
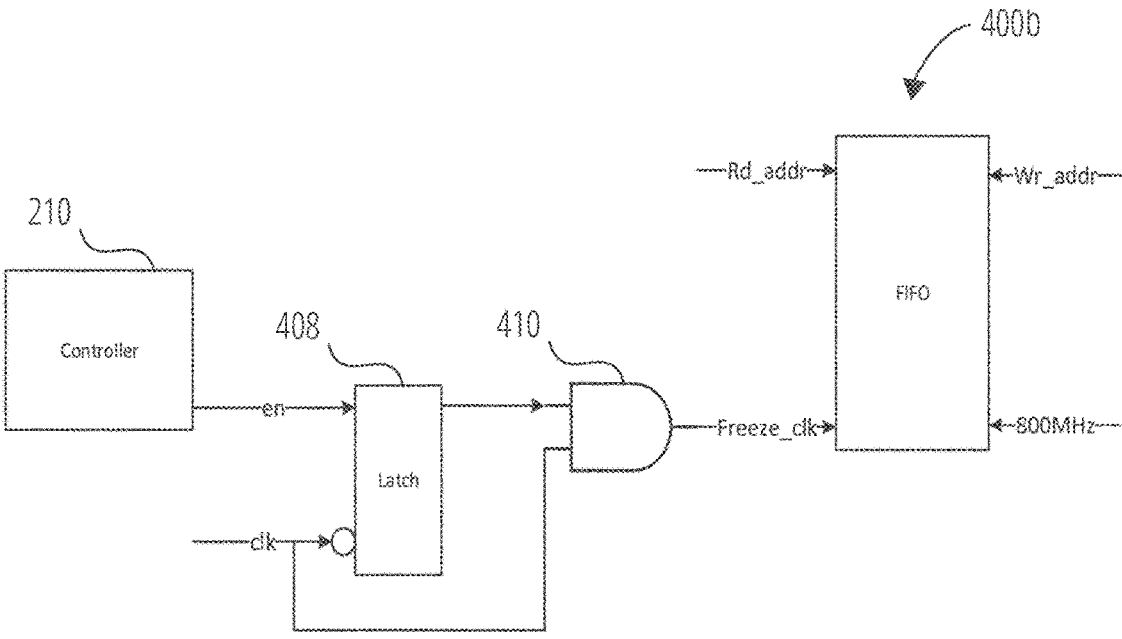
FIG. 4B is a circuit diagram of a freeze clock sent to one of an input buffer or an output buffer, according to one embodiment.

FIG. 4B is a circuit diagram of a freeze clock 400b, such as the input freeze clock 228 or output freeze clock 248, according to one embodiment. The freeze clock 400b may include the gating logic 400a as described above with respect to FIG. 4A. The gating logic 400a may be part of the controller 210. The gating logic 400a may cause an enable signal to be sent to a latch 408. The latch 408 may include a first input to receive the enable signal and a second input to receive a clock. In some embodiments, the clock may be one of the input write clock 224, the input read clock 226, the output write clock 244, or the output read clock 246, as described above with respect to FIG. 1. The latch 408 may provide a signal to a logic gate 410 representing a state of the latch 408. The state of the latch 408 may be enabled (e.g., HIGH, or a binary value of "1") or disabled (e.g., LOW, or a binary value of "0"). The logic gate 410 may also receive the clock. In some embodiments, the logic gate 410 may be an AND gate. An output of the logic gate 410 may be provided to a buffer. In some embodiments, the output of the logic gate 410 may be considered a "freeze clock" that is enabled during a misalignment event, such as a skip or repeat event. The buffer may be one of the input buffer 220 or output buffer 240, as described above with respect to FIGS. 2-3. In some embodiments, the "freeze clock" prevents a next incoming IQ sample (e.g., x[n+1]) from becoming a current IQ sample (e.g., x[n]) or causes a previous outgoing IQ sample (e.g., X[n−1]) to be overwritten by a current outgoing IQ sample (e.g., X[n]).

Figure 5A:
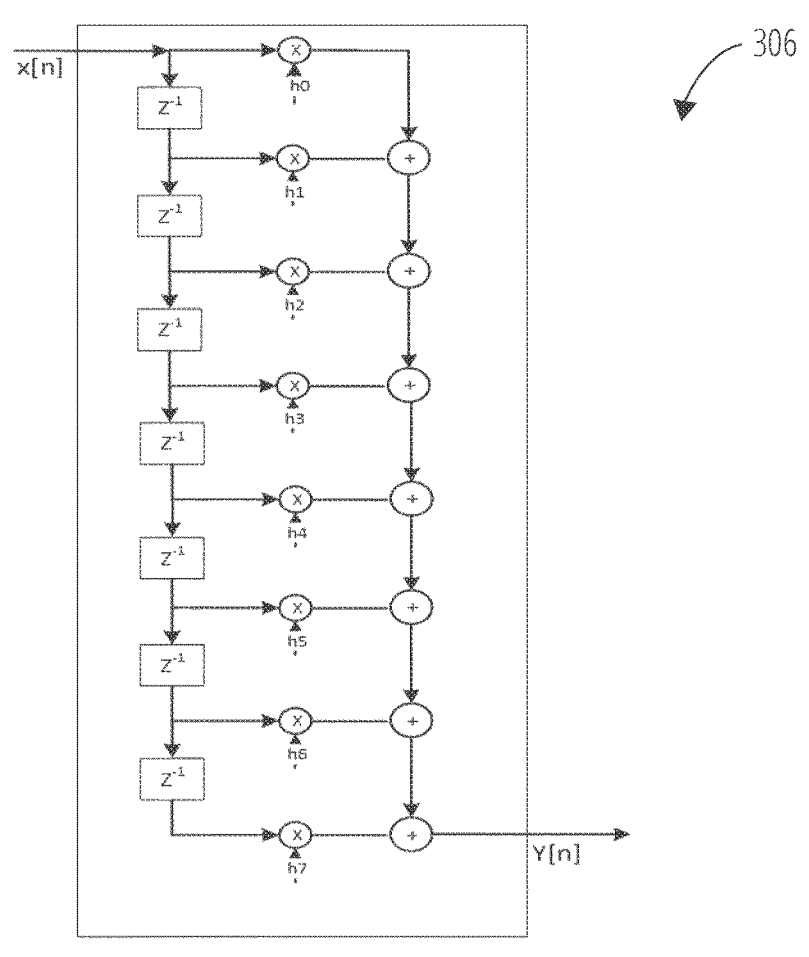
FIG. 5A is a flow diagram illustrating multiply-accumulation (MAC) logic of a farrow filter, according to one embodiment.

FIG. 5A is a flow diagram illustrating a first portion of a multiply-accumulation (MAC) logic 306 of a farrow filter, according to one embodiment. The first portion of the MAC logic 306 can be hardware, software, firmware, or any combination thereof. In at least one embodiment, the MAC logic 306 may be a circuit. In some embodiments, the MAC logic 306 receives incoming IQ samples (e.g., x[n]) in the time domain. An inverse Z-transform may be applied to each of the incoming IQ samples. A multiplication portion of the MAC logic 306 may interpolate the incoming IQ samples with a set of coefficients. The set of coefficients may be stored in the coefficient LUT 310, as described above with respect to FIG. 3. An accumulation part of the MAC logic 306 may sum the resulting interpolated data. The first portion of the MAC logic 306 may output frequency data (e.g., Y[n]).

Figure 5B:
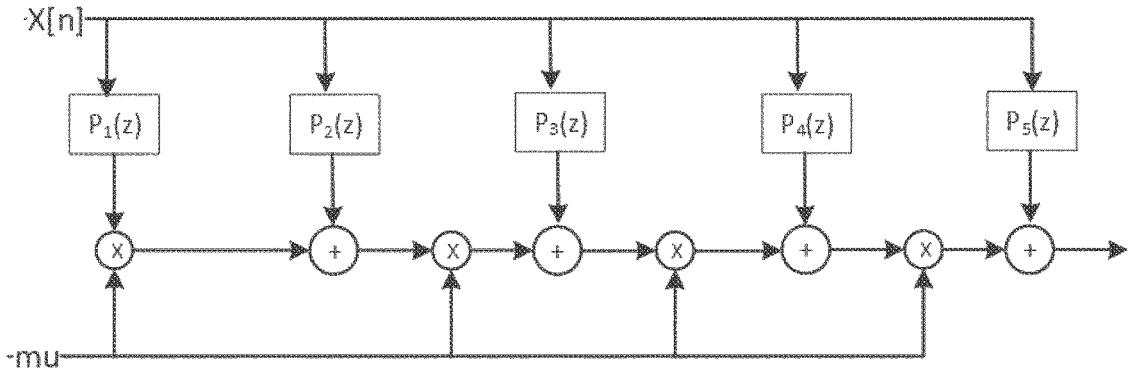
FIG. 5B is a flow diagram illustrating time drift error calculation logic, according to one embodiment.

FIG. 5B is a flow diagram illustrating a second portion of the MAC logic 306, according to one embodiment. The second portion of the MAC logic 306 can be hardware, software, firmware, or any combination thereof. In some embodiments, the second portion of the MAC logic 306 receives frequency data (e.g., X[n]) from the first portion of the MAC logic 306. The frequency data may be converted to the time domain by one or more Z transforms. The resulting time domain data may be multiplied by a time drift error (e.g., mu, or u) and accumulated into an output. The output may be at least part of a current outgoing IQ sample (e.g., y[n] of equation (1)) to be stored by the output buffer 240 as described above with respect to at least FIGS. 2-3.

Figure 6:
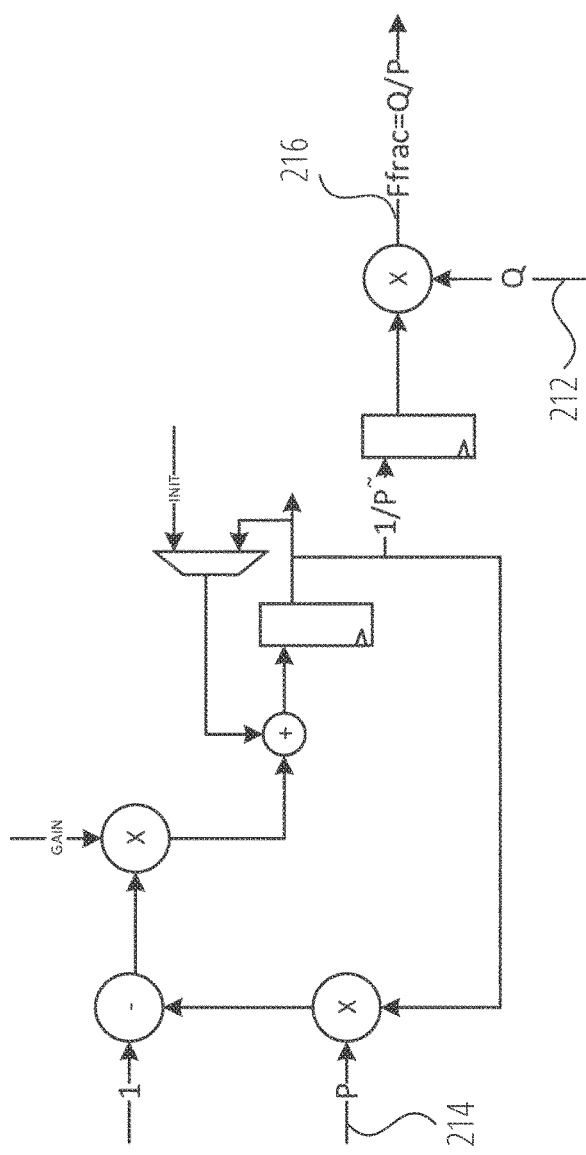
FIG. 6 illustrates divider-less circuitry for calculating a sampling ratio, according to one embodiment.

FIG. 6 illustrates divider-less circuitry 600 for calculating a sampling ratio, according to one embodiment. In some embodiments, the divider-less circuitry 600 includes an upsampling rate signal "Q", a downsampling rate signal "P", and a gain as inputs. A feedback loop including P, the gain, and at least one latch to generate a signal representing a reciprocal of the downsampling rate signal (i.e., 1/P). An initialization signal (e.g., "INIT") may be received by the divider-less circuitry 600 at periodic intervals that causes the feedback loop to recalculate a reciprocal of the downsampling rate signal. In various embodiments, after a certain number of periodic intervals, the feedback loop may output a signal that is the reciprocal of the downsampling rate with negligible error. The voltage equal to the reciprocal of the downsampling rate signal is then multiplied by upsampling rate signal to generate a ratio (e.g., Q/P). The ratio may be the sampling ratio as described above with respect to FIGS. 1-3.

FIG. 7 is a graph 700 illustrating a resampling of incoming IQ samples into outgoing IQ samples, according to one embodiment. The graph may illustrate amplitudes (vertical axis) of multiple incoming IQ samples (i.e., x[(n−1) Ts], x[(n) Ts], x[(n+1) Ts], x[(n+2) Ts]) sampled over time (horizontal axis) and an amplitude of an outgoing IQ sample (i.e., x[(n)Ts+μTs]). The amplitude of the outgoing IQ sample may be determined using the equation below the graph 700, which is similar to equation (1) as described above with respect to FIGS. 1-3.

Figure 8A:
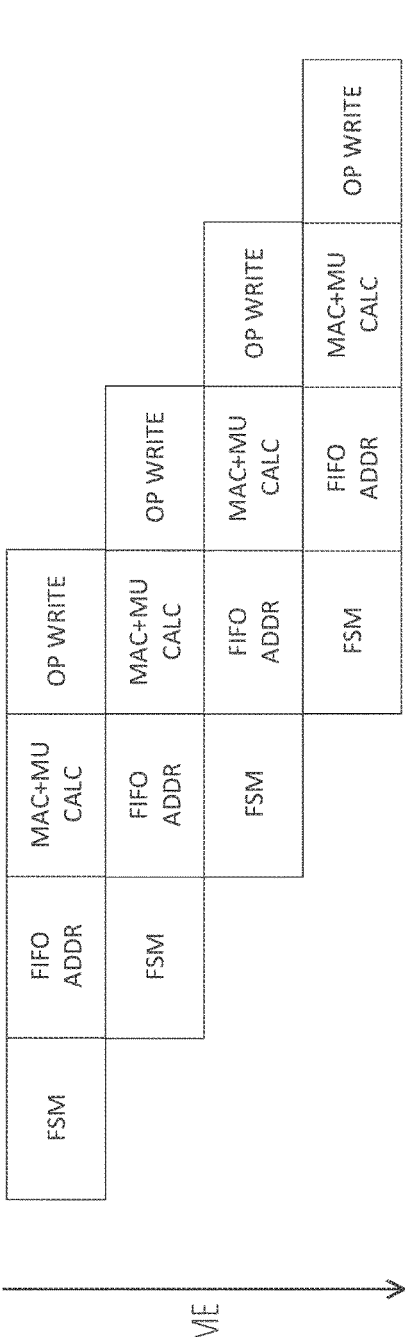
FIG. 8A is illustrates a hardware pipeline of resampling logic, according to one embodiment.

FIG. 8A is illustrates a hardware pipeline 800a of resampling logic, according to one embodiment. A hardware pipeline is a type of architecture that allows multiple instructions to be executed concurrently by breaking down a process into distinct stages. By breaking down a process into distinct stages, a number of instructions that can be processed at a given time may be increased. A hardware pipeline may also be called parallel processing.

In some embodiments, the hardware pipeline 800a may include (i) a finite state machine (FSM) initialization stage (e.g., FSM), (ii) an input buffer read stage (e.g., FIFO ADDR), (iii) a resampling stage (e.g., MAC+MU CALC), and (iv) an output buffer write stage (e.g., OP WRITE). In some embodiments, the resampling stage may be separated into two stages (e.g., a MAC CALC stage and a MU CALC stage).

In various embodiments, each stage of the hardware pipeline 800a may correspond to one or more incoming or outgoing IQ samples, as described above with respect to FIGS. 1-7. The hardware pipeline 800a may iteratively generate an outgoing IQ sample using one or more incoming IQ samples and write the newly-generated outgoing IQ sample to an output buffer.

Figure 8B:
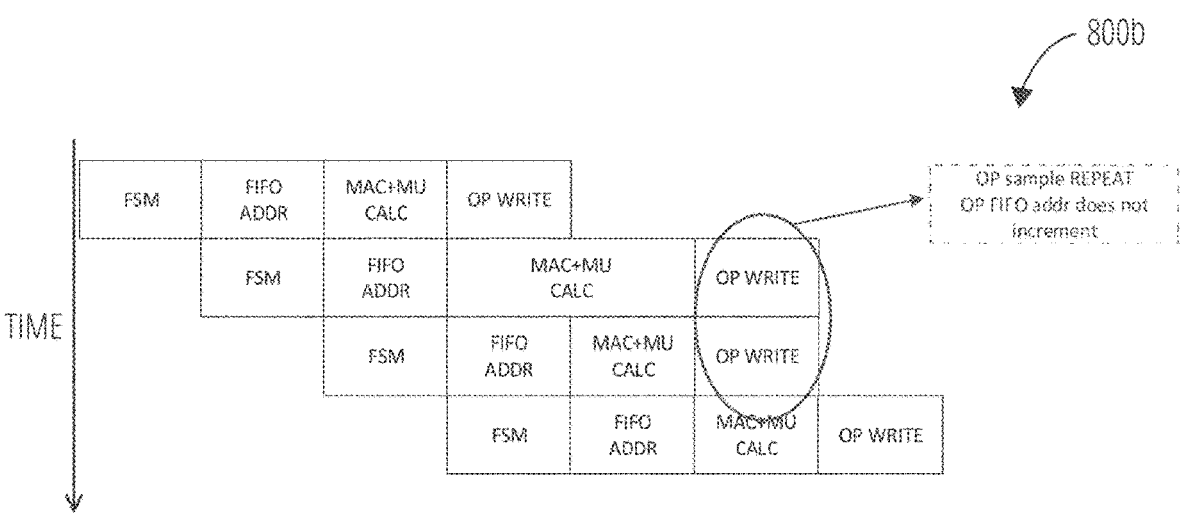
FIG. 8B illustrates a hardware pipeline of resampling logic handling a repeat event, according to one embodiment.

FIG. 8B illustrates a hardware pipeline 800b of resampling logic handling a repeat event, according to one embodiment. The hardware pipeline 800b may be the hardware pipeline 800a when handling a repeat event. A repeat event may be handled in a manner similar to what is described above with respect to FIGS. 1-3. For example, the hardware pipeline 800b may cause a "repeat" outgoing IQ sample to be overwritten on the output buffer.

Figure 8C:
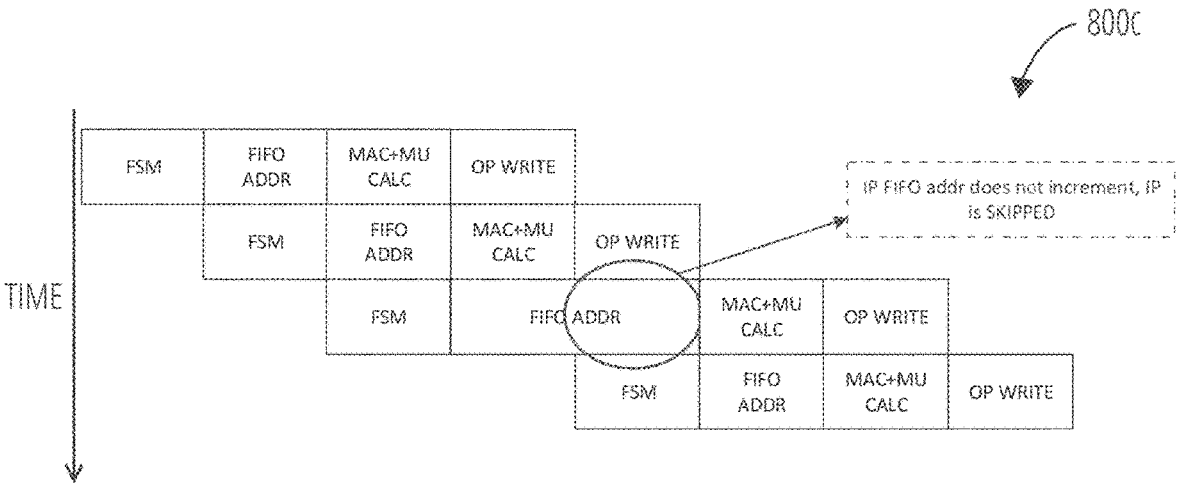
FIG. 8C illustrates a hardware pipeline of resampling logic handling a skip event, according to one embodiment.

FIG. 8C illustrates a hardware pipeline 800c of resampling logic handling a skip event, according to one embodiment. The hardware pipeline 800c may be the hardware pipeline 800a when handling a skip event. A skip event may be handled in a manner similar to what is described above with respect to FIGS. 1-3. For example, the hardware pipeline 800c may cause an increment of the input buffer to be "skipped", resulting on duplicate outgoing IQ samples.

Figure 9A:
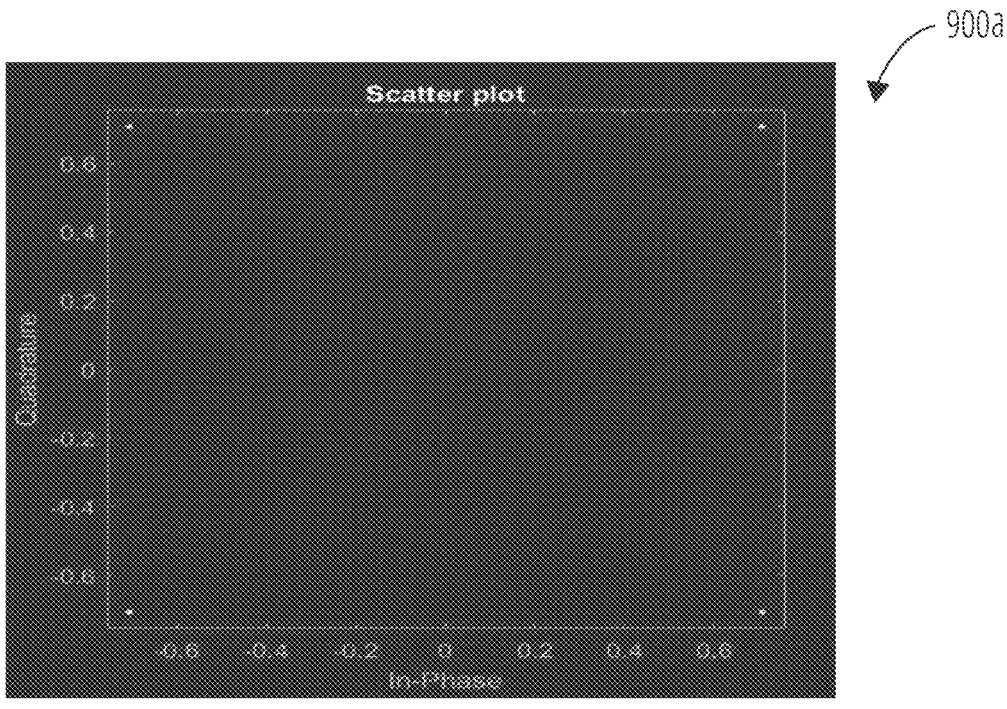
FIG. 9A is a constellation graph of a transmitted signal as transmitted by a transmitting device within a communication system, according to one embodiment.

FIG. 9A is a constellation graph 900a of a transmitted signal as transmitted by a transmitting device within a communication system, according to one embodiment. A constellation graph may be used to observe a doppler shift in communication systems when there is relative motion between transmitter and receiver (e.g., satellite and ground station). Here, graph 900a is of a signal transmitted by a transmitting device within a communication system. In some embodiments, the transmitting device may be a satellite.

Figure 9B:
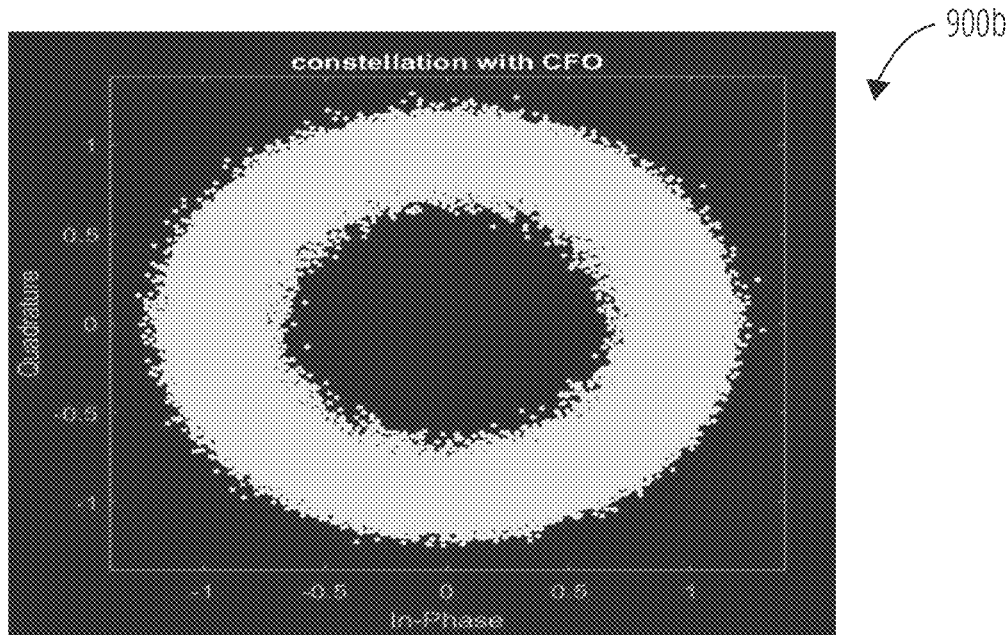
FIG. 9B is a constellation graph of the transmitted signal of FIG. 9A as received by a receiving device within the communication system, according to one embodiment.

FIG. 9B is a constellation graph of the transmitted signal of FIG. 9A as received by a receiving device within the communication system, according to one embodiment. As shown by FIG. 9B, a signal transmitted by a satellite may be affected by a doppler shift dependent on relative motion between the satellite and a receiving device (e.g, ground station). Here, graph 900b is of the signal transmitted by the transmitting device after it is received by a receiving device within the communication system. Without correcting for the doppler shift, the transmitted signal, as received by the receiving device, may not be readable or understandable.

FIG. 9C is a constellation graph 900c of the transmitted signal as received by the receiving device after passing through resampling logic, according to one embodiment. The resampling logic may be the resampling logic 110 as described above with respect to FIGS. 1-8. After passing through the resampling logic, the signal represented by the graph 900c more closely resembles the constellation graph 900a of the original transmitted signal. Though graphs 900a and 900c may not be identical, graph 900c may indicate that enough of the doppler shift has been handled by the resampling logic in order for the received signal to be readable and understandable.

FIG. 10 is a flowchart illustrating a method 1000 of resampling, according to one embodiment. The method 1000 may be implemented by hardware, software, firmware, or a combination thereof. In at least one embodiment, the method 1000 is performed by processing logic comprising hardware, software, firmware, or a combination thereof. The processing logic may be a controller combined with hardware components, such as the resampling logic 110 as described above with respect to at least FIGS. 1-3. In some embodiments, the processing logic may be comprised of multiple devices. In at least one embodiment, a wireless device performs the operations the resampling logic 110, such as a satellite, ground station, or customer terminal (CT) as described in FIGS. 8-12.

At block 1002, the processing logic may cause an input buffer to receive a first set of incoming samples of an incoming stream associated with a first frequency.

At block 1004, the processing logic may generate a first outgoing sample of an outgoing stream associated with a second frequency lower than the first frequency. The first outgoing sample may be generated using the first set of incoming samples.

At block 1006, the processing logic may cause an output buffer to receive the first outgoing sample.

At block 1008, the processing logic may determine, using a first ratio between the first and second frequencies, that the first outgoing sample is associated with a misalignment between the incoming data stream and the outgoing data stream. In some embodiments, determine that the first outgoing sample is associated with a misalignment between the incoming and outgoing streams, the processing logic compares a first counter corresponding to the first frequency to a second counter corresponding to the second frequency. In at least some of these embodiments, to compare the first counter to the second counter, the processing logic (i) generates the second counter by multiplying the first counter by the first ratio, (ii) concurrently increments the first and second counters, and (iii) identifies each increment of the first and second counters that a difference between the first and second counters reaches an integer.

At block 1010, the processing logic may cause the input buffer to receive a next incoming sample associated with the first frequency.

At block 1012, the processing logic may generate a second outgoing sample associated with the second frequency. The processing logic may generate the second outgoing sample using a second set of samples including the next incoming sample.

At block 1014, the processing logic may overwrite, in the output buffer, the first outgoing sample with the second outgoing sample. In some embodiments, to overwrite the first outgoing sample, the processing logic may enable a first gated clock. The first gated clock may prevent a write pointer corresponding to the output buffer from updating.

In some embodiments, a filter index of a plurality of filter indices may correspond to the first outgoing sample. In these embodiments, the processing logic may receive, at a controller, the filter index, and overwrite the first sample in response to the controller receiving the filter index.

In at least one embodiment, the processing logic may further receive a third set of incoming samples associated with a third frequency lower than the second frequency. The processing logic may generate a third outgoing sample using the third set of incoming samples. The processing logic may determine, using a second ratio between the second and third frequencies, that the third outgoing sample is associated with a misalignment between the incoming and outgoing streams. The processing logic may then generate a fourth outgoing sample using the third set of incoming samples. The fourth outgoing sample may be a duplicate of the third outgoing sample. Before generating the fourth outgoing sample, the processing logic may enable a second gated clock. The second gated clock may prevent a read pointer corresponding to the input buffer from incrementing or updating.

Figure 11:
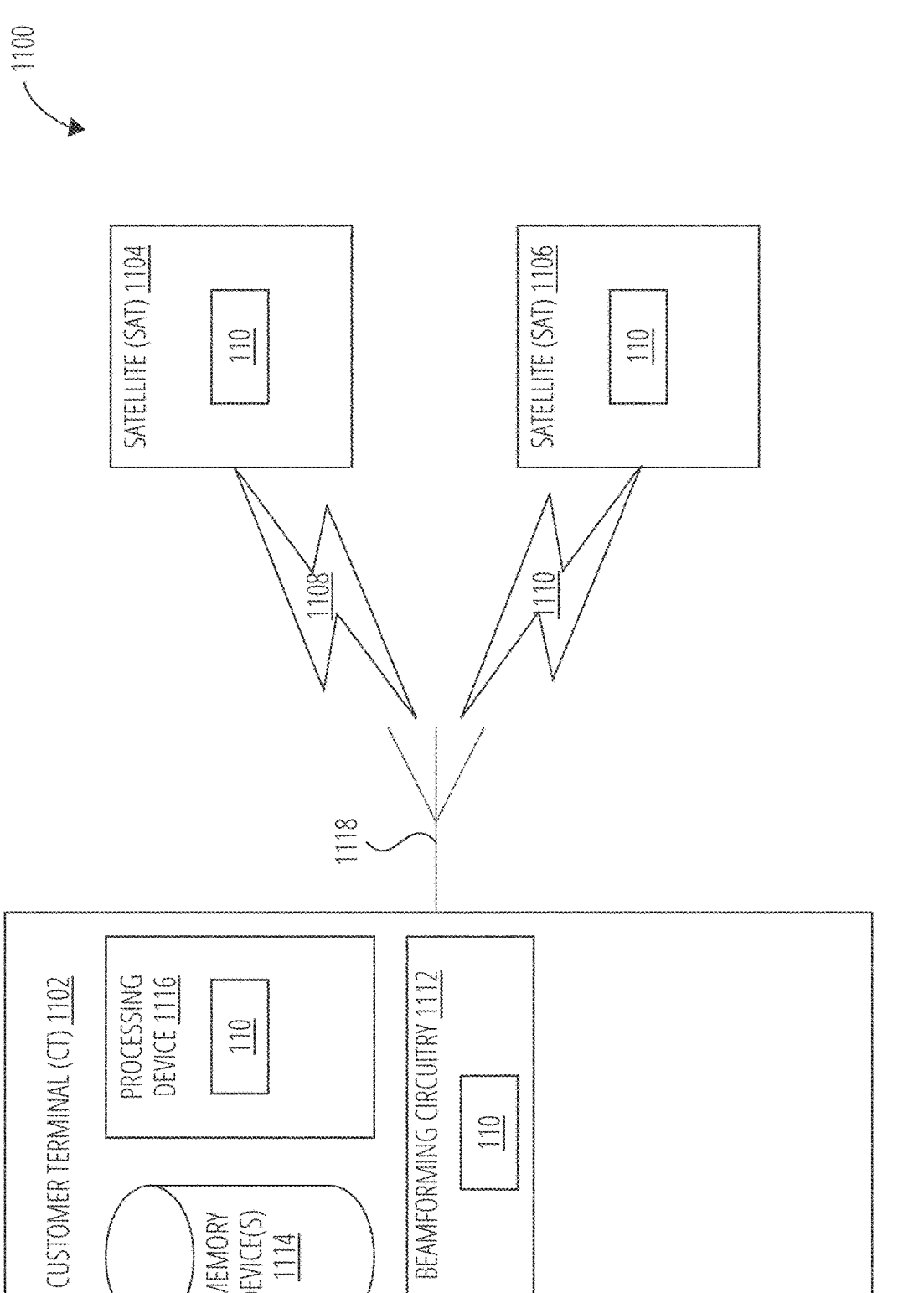
FIG. 11 is a block diagram of a satellite (SAT) network including a customer terminal with a phased array with in-field calibration antennas, according to at least one embodiment.

FIG. 11 is a block diagram of a satellite (SAT) network 100 including a customer terminal (CT 1102) with a phased array antenna 1118 with in-field calibration antennas according to at least one embodiment. The satellite network 1100 can include multiple communication devices, including communication devices in CTs, SATs, etc. The CT 1102 can be the UT 1210 described below with respect to FIG. 12. The SAT 1104 can be any one of the SAT1 1204*a*, SAT2 1204*b*, . . . , etc., of FIG. 12. The communication devices in the satellite network 1100 can receive position, navigation, and timing (PNT) information from an SAT 1106. The processing device 1116 can establish a communication link 1110 with the SAT 1104 and a communication link 1108 with SAT 1106. The SAT 1104 and SAT 1106 can be artificial satellites and may include one or more satellite communication elements (e.g., discussed further in FIG. 12 to FIG. 15). The SAT 1104 can be considered an anchor SAT that provides PNT information. One or more of the SAT 1104 or the SAT 1106 may include the resampling logic 110, as described above with respect to FIGS. 1-8.

In at least one embodiment, the CT 1102 includes one or more processing devices 1116 that implement beamforming circuitry 1112, and one or more memory device(s) 1114. The processing device 1116 can be or include one or more CPUs, microcontrollers, field programmable gate arrays, or other types of processors. The beamforming circuitry 1112 can be coupled to one or more antennas, such as a phased array phased array antenna 118, to communicate with other devices. In some embodiments, the beamforming circuitry 1112 or the processing device 1116 may include the resampling logic 110 as described above with respect to FIGS. 1-8. In other embodiments, a combination of the processing device 1116 and the beamforming circuitry 1112 may include or perform the operations of the resampling logic 110. The CT 1102 can include other circuitry for communicating wirelessly. For example, the CT 1102 can include one or more RF chains. The RF chains can have low-noise amplifiers (LNAs), automatic gain controllers (AGCs), analog-to-digital converters (ADCs), digital beamforming (DBF) devices, etc., to transmit signals and/or process received signals (e.g., directs analog and digital beamforming components, converts the signal to a digital representation, and processing the digital information) to produce digital samples of the received signal. In some embodiments, instead of two or more antennas, a single antenna with multiple apertures may be used. The RF chain(s) can be configured to directly receive beams to receive signals at various beamforming angles. Receive beams may be directed using a weighting pattern across beamforming elements and an antenna array. The weighting pattern may result in a sensitivity pattern due to signal interference. An antenna gain pattern may include a weighting pattern (or distribution of signal processing weights) that may include a combination of beamforming values, such as phase shifting values, signal amplifier values, etc., that are configured to steer a signal (e.g., main lobe, side lobes, signal minimum points, etc.) to orient at different directions. An antenna gain pattern may include a main lobe, side lobes, and signal minimums spread across various directions relative to a bearing angle of an antenna array. In some embodiment, a bearing angle is defined as a direction normal to a plane of an antenna array (or, more generally, a portion and an array antenna). Further details regarding beamforming and beam steering are discussed in FIG. 15.

Although devices of the satellite network 1100 are illustrated as having several separate functional elements, one or more of the functional elements may be combined and may be implemented by combinations of software-configured elements, such as processing elements, including digital signal processors (DSPs), and/or other hardware elements. For example, some elements may comprise one or more microprocessors, DSPs, application-specific integrated circuits (ASICs), radio-frequency integrated circuits (RFICs), and combinations of various hardware and logic circuitry for performing at least the functions described herein. In some embodiments, the functional elements of a device may refer to one or more processes operating on one or more processing elements.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

Figure 12:
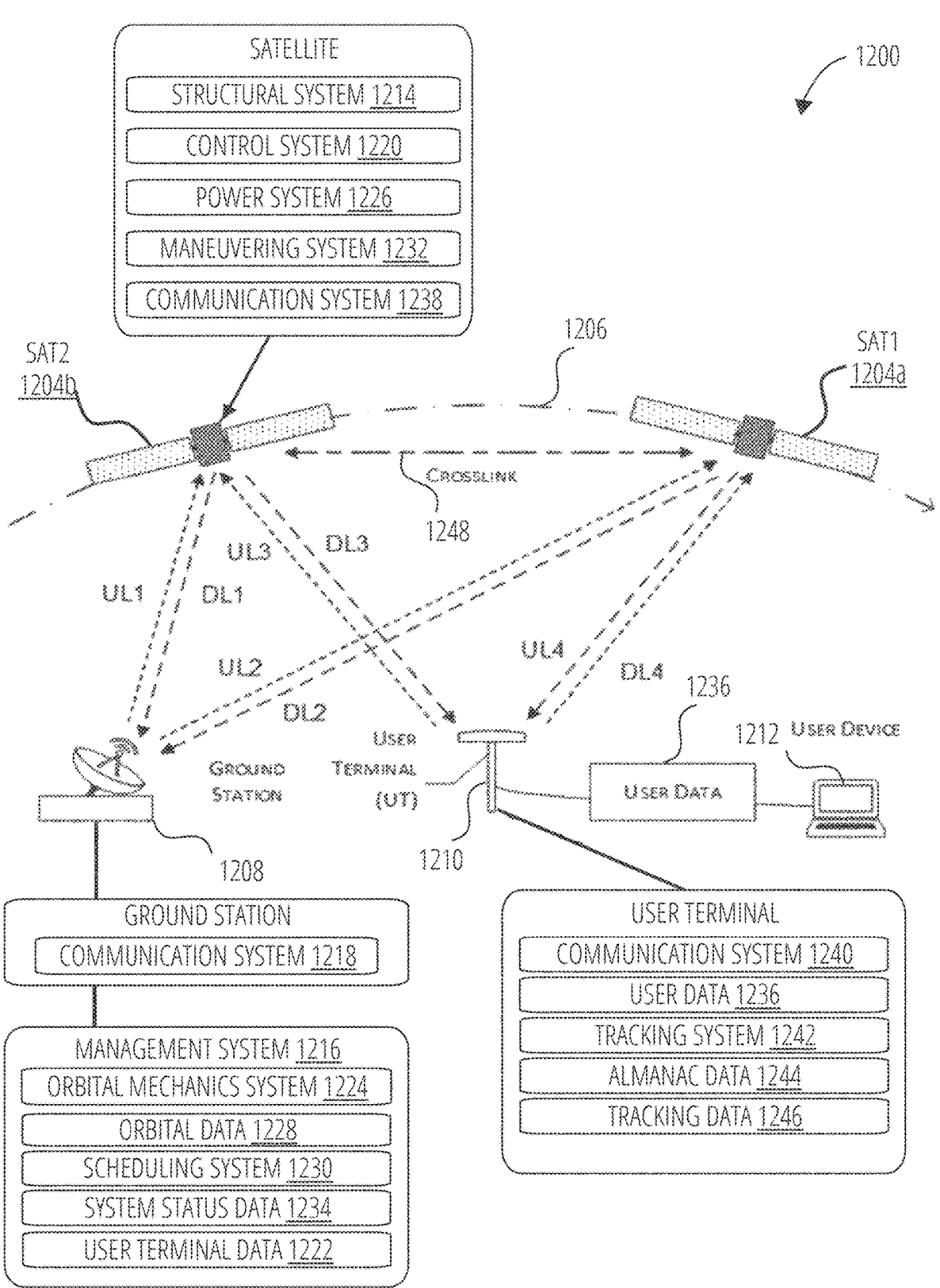
FIG. 12 illustrates a portion of a communication system that includes two satellites of a constellation of satellites, each satellite being in orbit, according to at least one embodiment.

FIG. 12 illustrates a portion of a communication system 1200 that includes two satellites of a constellation of satellite 1202 (e.g., SAT1 1204*a*, SAT2 1204*b*, . . . , etc.), each satellite 1202 being in orbit 1206 according to embodiments of the present disclosure. The system 1200 shown here comprises a plurality (or "constellation") of satellites SAT1 1204*a*, SAT2 1204*b*, . . . , etc., each satellite 1202 being in orbit 1206 as part of a satellite network, such as satellite network 1100 of FIG. 11. Also shown is a ground station 1208, a user terminal (UT) 1210 (also referred to herein as customer terminal (CT)), and a user device 1212.

The constellation may comprise hundreds or thousands of satellite 1202, in various orbits 1206. For example, one or more satellites 1202 may be in non-geosynchronous orbits (NGOs) in which they are in constant motion with respect to the Earth. For example, the orbit 1206 is a low earth orbit (LEO). In this illustration, orbit 1206 is depicted with an arc pointed to the right. A first satellite SAT1 1204*a* is leading (ahead of) a second satellite SAT2 1204*b* in the orbit 1206.

The satellite 1202 may comprise a structural system 1214, a control system 1220, a power system 1226, a maneuvering system 1232, and a communication system 1238. In other implementations, some systems may be omitted or other systems added. One or more of these systems may be communicatively coupled with one another in various combinations.

The structural system 1214 comprises one or more structural elements to support the operation of the satellite 1202. For example, the structural system 1214 may include trusses, struts, panels, and so forth. The components of other systems may be affixed to or housed by the structural system 1214. For example, the structural system 1214 may provide mechanical mounting and support for solar panels in the power system 1226. The structural system 1214 may also provide thermal control to maintain components of the satellite 1202 within heat sinks, radiators, and so forth.

The control system 1220 provides various services, such as operating the onboard systems, resource management, providing telemetry, processing commands, and so forth. For example, the control system 1220 may direct the operation of the communication system 1238.

The power system 1226 provides electrical power to operate the components onboard the satellite 1202. The power system 1226 may include components to generate electrical energy. For example, the power system 1226 may comprise one or more photovoltaic cells, thermoelectric devices, fuel cells, and so forth. The power system 1226 may include components to store electrical energy. For example, the power system 1226 may comprise one or more batteries, fuel cells, and so forth.

The maneuvering system 1232 maintains the satellite 1202 in one or more specified orientations or orbit 1206. For example, the maneuvering system 1232 may stabilize the satellite 1202 with respect to one or more axes. In another example, the maneuvering system 1232 may move the satellite 1202 to a specified orbit 1206. The maneuvering system 1232 may include one or more computing devices, sensors, thrusters, momentum wheels, solar sails, drag devices, and so forth. For example, the sensors of the maneuvering system 1232 may include one or more global navigation satellite system (GNSS) receivers, such as global positioning system (GPS) receivers, to provide information about the position and orientation of the satellite 1202 relative to Earth. In another example, the sensors of the maneuvering system 1232 may include one or more star trackers, horizon detectors, and so forth. The thrusters may include, but are not limited to, cold gas thrusters, hypergolic thrusters, solid-fuel thrusters, ion thrusters, arcjet thrusters, electrothermal thrusters, and so forth.

The communication system 1238 provides communication with one or more other devices, such as other satellite 1202, ground stations 1208, user terminals 1210, and so forth. The communication system 1238 may include one or more modems, digital signal processors, power amplifiers, antennas (including at least one antenna that implements multiple antenna elements, such as a phased array antenna and an embedded calibration antenna), processors, memories, storage devices, communications peripherals, interface buses, and so forth. Such components support communications with other satellite 1202, ground stations 1208, user terminals 1210, and so forth, using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 1238 may be output to other systems, such as the control system 1220, for further processing. Output from a system, such as the control system 1220, may be provided to the communication system 1238 for transmission. The communication system 1238 may include the resampling logic 110 to resample incoming IQ samples into outgoing IQ samples dependent on an anticipated or observed carrier frequency offset (CFO), as described above with respect to FIGS. 1-8.

One or more ground stations 1208 are in communication with one or more satellite 1202. The ground stations 1208 may pass data between the satellite 1202, a management system 1216, networks such as the Internet, and so forth. The ground stations 1208 may be emplaced on land, on vehicles, at sea, and so forth. Each ground station 1208 may comprise a communication system 1218. The aspects and embodiments of the present disclosure with respect to FIGS. 1-8 may occur within one or more of the communication system 1218 of the ground station 1208 and the satellite 1202. Each ground station 1208 may use the communication system 1218 to establish communication with one or more satellite 1202, other ground stations 1208, and so forth. The ground station 1208 may also be connected to one or more communication networks. For example, the ground station 1208 may connect to a terrestrial fiber optic communication network. The ground station 1208 may act as a network gateway, passing user data 1236 or other data between the one or more communication networks and the satellite 1202. Such data may be processed by the ground station 1208 and communicated via the communication system 1218. The communication system 1218 of a ground station 1208 may include components similar to those of the communication system 1238 of a satellite 1202 and may perform similar communication functionalities. For example, the communication system 1218 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 1208 are in communication with a management system 1216. The management system 1216 is also in communication, via the ground stations 1208, with the satellite 1202 and the UTs 1210. The management system 1216 coordinates the operation of the satellite 1202, ground stations 1208, UTs 1210, and other resources of the communication system 1200. The management system 1216 may comprise one or more of an orbital mechanics system 1224 or a scheduling system 1230. In some embodiments, the scheduling system 1230 can operate in conjunction with a hard disk (HD) controller.

The orbital mechanics system 1224 determines orbital data 1228 that is indicative of a state of a particular satellite 1202 at a specified time. In one implementation, the orbital mechanics system 1224 may use orbital elements that represent characteristics of the orbit 1206 of the satellite 1202 in the constellation to determine the orbital data 1228 that predicts location, velocity, and so forth of particular satellite 1202 at particular times or time intervals. For example, the orbital mechanics system 1224 may use data obtained from actual observations from tracking stations, data from the satellite 1202, scheduled maneuvers, and so forth to determine the orbital elements. The orbital mechanics system 1224 may also consider other data, such as space weather, collision mitigation, orbital elements of known debris, and so forth.

The scheduling system 1230 schedules resources to provide communication to the UTs 1210. For example, the scheduling system 1230 may determine handover data that indicates when communication is to be transferred from the first satellite SAT1 1204a to the second satellite SAT2 1204b. Continuing the example, the scheduling system 1230 may also specify communication parameters such as frequency, timeslot, and so forth. During operation, the scheduling system 1230 may use information such as the orbital data 1228, system status data 1234, user terminal data 1222, and so forth.

The system status data 1234 may comprise information such as which UTs 1210 are currently transferring data, satellite availability, current satellite 1202 in use by respective UTs 1210, capacity available at particular ground stations 1208, and so forth. For example, the satellite availability may comprise information indicative of satellite 1202 that are available to provide communication service or those satellite 1202 that are unavailable for communication service. Continuing the example, a satellite 1202 may be unavailable due to malfunction, previous tasking, maneuvering, and so forth. The system status data 1234 may be indicative of past status, predictions of future status, and so forth. For example, the system status data 1234 may include information such as projected data traffic for a specified interval of time based on previous transfers of user data 1236. In another example, the system status data 1234 may be indicative of future statuses, such as a satellite 1202 being unavailable to provide communication service due to scheduled maneuvering, scheduled maintenance, scheduled decommissioning, and so forth.

The user terminal data 1222 may comprise information such as a location of a particular UT 1210. The user terminal data 1222 may also include other information, such as a priority assigned to user data 1236 associated with that UT 1210, information about the communication capabilities of that particular UT 1210, and so forth. For example, a particular UT 1210 in use by a business may be assigned a higher priority relative to a UT 1210 operated in a residential setting. Over time, different versions of UTs 1210 may be deployed, having different communication capabilities, such as being able to operate at particular frequencies, supporting different signal encoding schemes, having different antenna configurations, and so forth.

The UT 1210 includes a communication system 1240 to establish communication with one or more satellite 1202. The communication system 1240 of the UT 1210 may include components similar to those of the communication system 1238 of a satellite 1202 and may perform similar communication functionalities. For example, the communication system 1240 may include one or more modems, digital signal processors, power amplifiers, antennas (including at least one antenna that implements multiple antenna elements, such as a phased array antenna), processors, memories, storage devices, communications peripherals, interface buses, and so forth. The UT 1210 passes user data 1236 between the constellation of satellite 1202 and the user device 1212. The user data 1236 includes data originated by the user device 1212 or addressed to the user device 1212. The UT 1210 may be fixed or in motion. For example, the UT 1210 may be used at a residence or on a vehicle such as a car, boat, aerostat, drone, airplane, and so forth.

The UT 1210 includes a tracking system 1242. The tracking system 1242 uses almanac data 1244 to determine tracking data 1246. The almanac data 1244 provides information indicative of orbital elements of the orbit 1206 of one or more satellite 1202. For example, the almanac data 1244 may comprise orbital elements such as "two-line element" data for the satellite 1202 in the constellation that are broadcast or otherwise sent to the UTs 1210 using the communication system 1240.

The tracking system 1242 may use the current location of the UT 1210 and the almanac data 1244 to determine the tracking data 1246 for the satellite 1202. For example, based on the current location of the UT 1210 and the predicted position and movement of the satellite 1202, the tracking system 1242 can calculate the tracking data 1246. The tracking data 1246 may include information indicative of azimuth, elevation, distance to the second satellite, time of flight correction, or other information at a specified time. The determination of the tracking data 1246 may be ongoing. For example, the first UT 1210 may determine tracking data 1246 every 1200 ms, every second, every five seconds, or at other intervals.

With regard to FIG. 12, an uplink (UL) is a communication link that allows data to be sent to a satellite 1202 from a ground station 1208, UT 1210, or a device other than another satellite 1202. Uplinks are designated as UL1, UL2, UL3, and so forth. For example, UL1 is a first uplink from the ground station 1208 to the second satellite 902*b*. In comparison, a downlink is a communication link that allows data to be sent from the satellite 1202 to a ground station 1208, UT 1210, or a device other than another satellite 1202. For example, UL1 is a first downlink from the second satellite 902*b* to the ground station 1208. The satellite 1202 may also be in communication with one another. For example, a crosslink 1248 provides for communication between satellite 1202 in the constellation.

The satellite 1202, the ground station 1208, the user terminal 1210, the user device 1212, the management system 1216, or other systems described herein may include one or more computer devices or computer systems comprising one or more hardware processors, computer-readable storage media, and so forth. For example, the hardware processors may include application-specific integrated circuits (ASICs), field-programmable gate arrays (FPGAs), microcontrollers, digital signal processors (DSPs), and so forth. The computer-readable storage media can include system memory, which may correspond to any combination of volatile and/or non-volatile memory or storage technologies. The system memory can store information that provides an operating system, various program modules, program data, and/or other software or firmware components.

In one embodiment, the system memory stores instructions of methods to control the operation of the electronic device. The electronic device performs functions by using the processor(s) to execute instructions provided by the system memory. Embodiments may be provided as a software program or computer program, including a non-transitory computer-readable storage medium having stored thereon instructions (in compressed or uncompressed form) that may be used to program a computer (or other electronic devices) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product, including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise the transmission of software by the Internet.

FIG. 13 is a functional block diagram of some systems associated with the satellite 1202, according to some implementations. The satellite 1202 may comprise a structural system 1214, a control system 1220, a power system 1226, a maneuvering system 1232, one or more sensor(s) 1302, and a communication system 1238. A pulse per second (PPS) system 1304 may be used to provide a timing reference to the systems onboard the satellite 1202. One or more bus(es) 1306 may be used to transfer data between the systems onboard the satellite 1202. In some implementations, redundant busses may be provided. The bus(es) 1306 may include, but are not limited to, data busses such as Controller Area Network Flexible Data Rate (CAN FD), Ethernet, Serial Peripheral Interface (SPI), and so forth. In some implementations, the bus(es) 1306 may carry other signals. For example, a radio frequency bus may comprise a coaxial cable, waveguides, and so forth to transfer radio signals from one part of the satellite 1202 to another. In other implementations, some systems may be omitted, or other systems added. One or more of these systems may be communicatively coupled with one another in various combinations.

The structural system 1214 comprises one or more structural elements to support the operation of the satellite 1202. For example, the structural system 1214 may include trusses, struts, panels, and so forth. The components of other systems may be affixed to or housed by the structural system 1214. For example, the structural system 1214 may provide mechanical mounting and support for solar panels in the power system 1226. The structural system 1214 may also provide for thermal control to maintain components of the satellite 1202 within heat sinks, radiators, and so forth.

The control system 1220 provides various services, such as operating the onboard systems, resource management, providing telemetry, processing commands, and so forth. For example, the control system 1220 may direct the operation of the communication system 1238. The control system 1220 may include one or more flight control processors 1308. The flight control processors 1308 may comprise one or more processors, FPGAs, and so forth. A tracking, telemetry, and control (TTC) system 1310 may include one or more processors, radios, and so forth. For example, the TTC system 1310 may comprise a dedicated radio transmitter and receiver to receive commands from a ground station 1208, send telemetry to the ground station 1208, and so forth. A power management and distribution (PMAD) system 1312 may direct the operation of the power system 1226, control distribution of power to the systems of the satellite 1202, battery 1314 charging, and so forth.

The power system 1226 provides electrical power to operate the components onboard the satellite 1202. The power system 1226 may include components to generate electrical energy. For example, the power system 1226 may comprise one or more photovoltaic (PV) arrays 1316 comprising a plurality of photovoltaic cells, thermoelectric devices, fuel cells, and so forth. One or more PV array actuators 1318 may be used to change the orientation of the photovoltaic array(s) 1316 relative to the satellite 1202. For example, the PV array actuator 1318 may comprise a motor. The power system 1226 may include components to store electrical energy. For example, the power system 1226 may comprise one or more batteries 1314, fuel cells, and so forth.

The maneuvering system 1232 maintains the satellite 1202 in one or more specified orientations or orbit 1206. For example, the maneuvering system 1232 may stabilize the satellite 1202 with respect to one or more axes. In another example, the maneuvering system 1232 may move the satellite 1202 to a specified orbit 1206. The maneuvering system 1232 may include one or more of reaction wheel(s) 1320, thrusters 1322, magnetic torque rods 1324, solar sails, drag devices, and so forth. The thrusters 1322 may include, but are not limited to, cold gas thrusters, hypergolic thrusters, solid-fuel thrusters, ion thrusters, arcjet thrusters, electrothermal thrusters, and so forth. During operation, the thrusters may expend propellant. For example, an electrothermal thruster may use water as propellent, using electrical power obtained from the power system 1226 to expel the water and produce thrust. During operation, the maneuvering system 1232 may use data obtained from one or more of the sensor(s) 1302.

The satellite 1202 includes one or more sensor(s) 1302. The sensor(s) 1302 may include one or more engineering camera(s) 1326. For example, an engineering camera 1326 may be mounted on the satellite 1202 to provide images of at least a portion of the PV array 1316. Accelerometer(s) 1328 provide information about the acceleration of the satellite 1202 along one or more axes. Gyroscope(s) 1330 provide information about the rotation of the satellite 1202 with respect to one or more axes. The sensor(s) 1302 may include a global navigation satellite system (GNSS) receiver 1332, such as a Global Positioning System (GPS) receiver, to provide information about the position of the satellite 1202 relative to Earth. In some implementations, the GNSS 1332 may also provide information indicative of velocity, orientation, and so forth. One or more star tracker(s) 1334 may be used to determine an orientation of the satellite 1202. A coarse sun sensor 1336 may be used to detect the sun, provide information on the relative position of the sun with respect to the satellite 1202, and so forth. The satellite 1202 may include other sensor(s) 1302 as well. For example, the satellite 1202 may include a horizon detector, radar, lidar, and so forth.

The communication system 1238 provides communication with one or more other devices, such as other satellites 1202, ground stations 1208, user terminals 1210, and so forth. The communication system 1238 may include one or more modems 1338, digital signal processors, power amplifiers, antennas antenna 1340 (including a calibration antenna 1342), such as a phased array antenna), processors, memories, storage devices, communications peripherals, interface buses, and so forth. Such components support communications with other satellites 1202, ground stations 1208, user terminals 1210, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 1238 may be output to other systems, such as the control system 1220, for further processing. Output from a system, such as the control system 1220, may be provided to the communication system 1238 for transmission.

The communication system 1238 may include hardware to support the crosslink 1248 (e.g., intersatellite (ISL) link). For example, an intersatellite link FPGA 1344 may be used to modulate data sent and received by one or more ISL transceiver(s) 1346 to send data between satellites 1202. The ISL transceiver(s) 1346 may operate using radio frequencies, optical frequencies, and so forth.

A communication FPGA 1348 may be used to facilitate communication between the satellite 1202 and the ground stations 1208, UTs 1210, and so forth. For example, the communication FPGA 1348 may direct the operation of a modem 1338 to modulate signals sent using a downlink transmitter 1350 and demodulate signals received using an uplink receiver 1352. The satellite 1202 may include one or more antennas 1340. For example, one or more parabolic antennas may be used to provide communication between the satellite 1202 and one or more ground stations 1208. In another example, a phased array antenna may be used to provide communication between the satellite 1202 and the UTs 1210.

Figure 14:
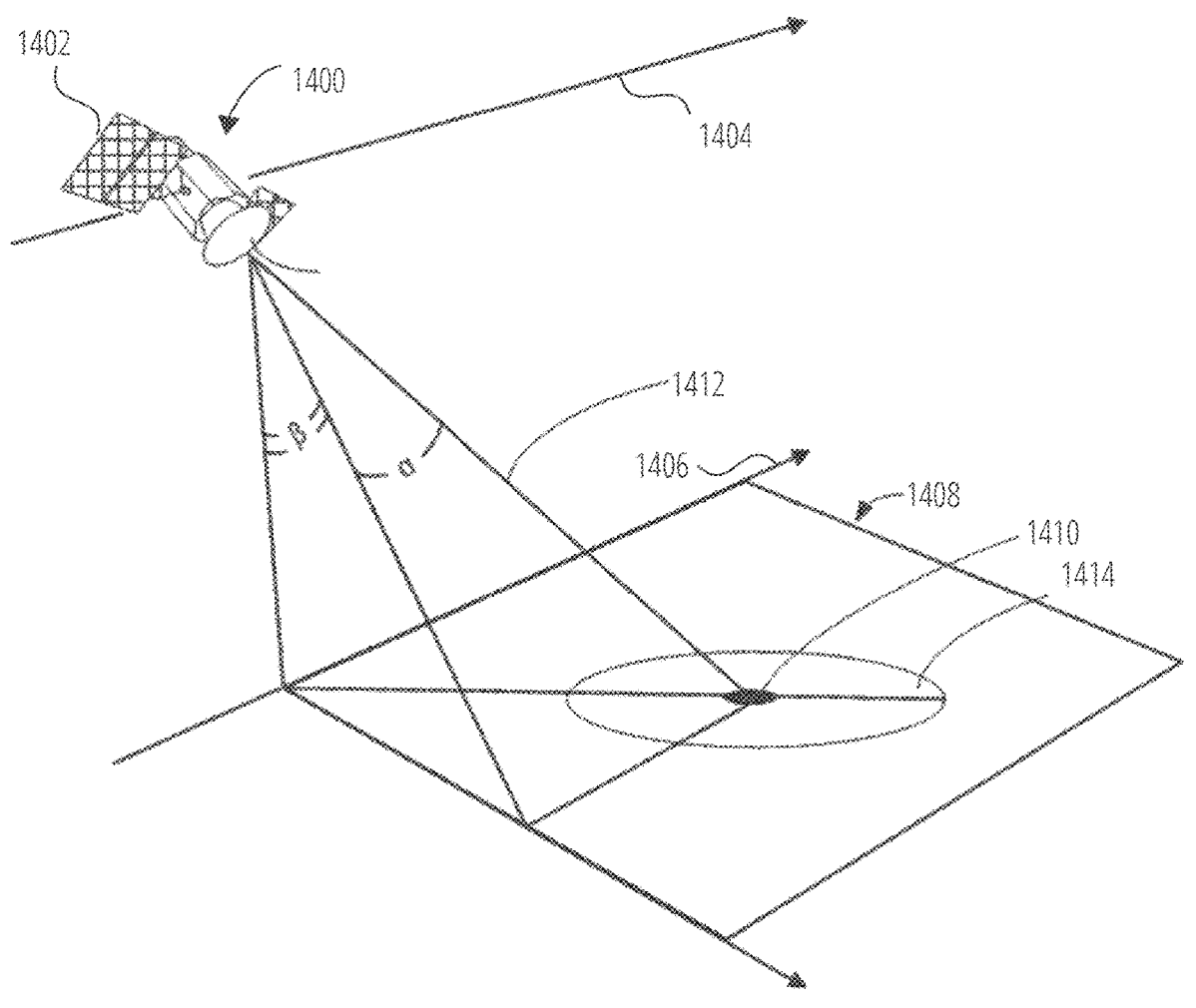
FIG. 14 illustrates the satellite including an antenna system that is steerable, according to at least one embodiment.

FIG. 14 illustrates the satellite 1400 including an antenna system 1402 that is steerable according to embodiments of the present disclosure. The satellite 1400 can be the SAT 1202 of the satellite network 1100 of FIG. 11. The antenna system 1402 may include multiple antenna elements that form an antenna and can be mechanically or electrically steered individually, collectively, or a combination thereof. In an example, the antenna is a phased array antenna.

In orbit 1206, the satellite 1400 follows a path 1404, the projection of which onto the surface of the Earth forms a ground path 1406. In the example illustrated in FIG. 14, the ground path 1406 and a projected axis extending orthogonally from the ground path 1406 at the position of the satellite 1400, together define a region 1408 of the surface of the Earth. In this example, the satellite 1400 can establish uplink and downlink communications with one or more of ground stations, user terminals, or other devices within the region 1408. In some embodiments, the region 1408 may be located in a different relative position to the ground path 1406 and the position of the satellite 1400. For example, the region 1408 may describe a region of the surface of the Earth directly below the satellite 1400. Furthermore, embodiments may include communications between the satellite 1400, an airborne communications system, and so forth.

As shown in FIG. 14, a communication target 1410 (e.g., a ground station, a user terminal, or a CT (such as an HD CT)) is located within the region 1408. The satellite 1400 controls the antenna system 1402 to steer transmission and reception of communications signals to selectively communicate with the communication target 1410. For example, in a downlink transmission from the satellite 1400 to the communication target 1410, a signal beam 1412 emitted by the antenna system 1402 is steerable within an area 1414 of the region 1408. In some implementations, the signal beam 1412 may include multiple subbeams. The extents of the area 1414 define an angular range within which the signal beam 1412 is steerable, where the direction of the signal beam 1412 is described by a beam angle "$\alpha$" relative to a surface normal vector of the antenna system 1402. In two-dimensional phased array antennas, the signal beam 1412 is steerable in two dimensions, described in 15 by a second angle "$\beta$" orthogonal to the beam angle $\alpha$. In this way, the area 1414 is a two-dimensional area within the region 1408, rather than a linear track at a fixed angle determined by the orientation of the antenna system 1402 relative to the ground path 1406.

In FIG. 14, as the satellite 1400 follows the path 1404, the area 1414 tracks along the surface of the Earth. In this way, the communication target 1410, which is shown centered in the area 1414 for clarity, is within the angular range of the antenna system 1402 for a period of time. During that time, signals communicated between the satellite 1400 and the communication target 1410 are subject to bandwidth constraints, including but not limited to signal strength and calibration of the signal beam 1412. In an example, for phased array antenna systems, the signal beam 1412 is generated by an array of mutually coupled antenna elements, wherein constructive and destructive interferences produce a directional beam. Among other factors, phase drift, amplitude drift (e.g., of a transmitted signal in a transmitter array), and so forth affect the interference properties and, thus, the resultant directional beam or subbeam.

Figure 15:
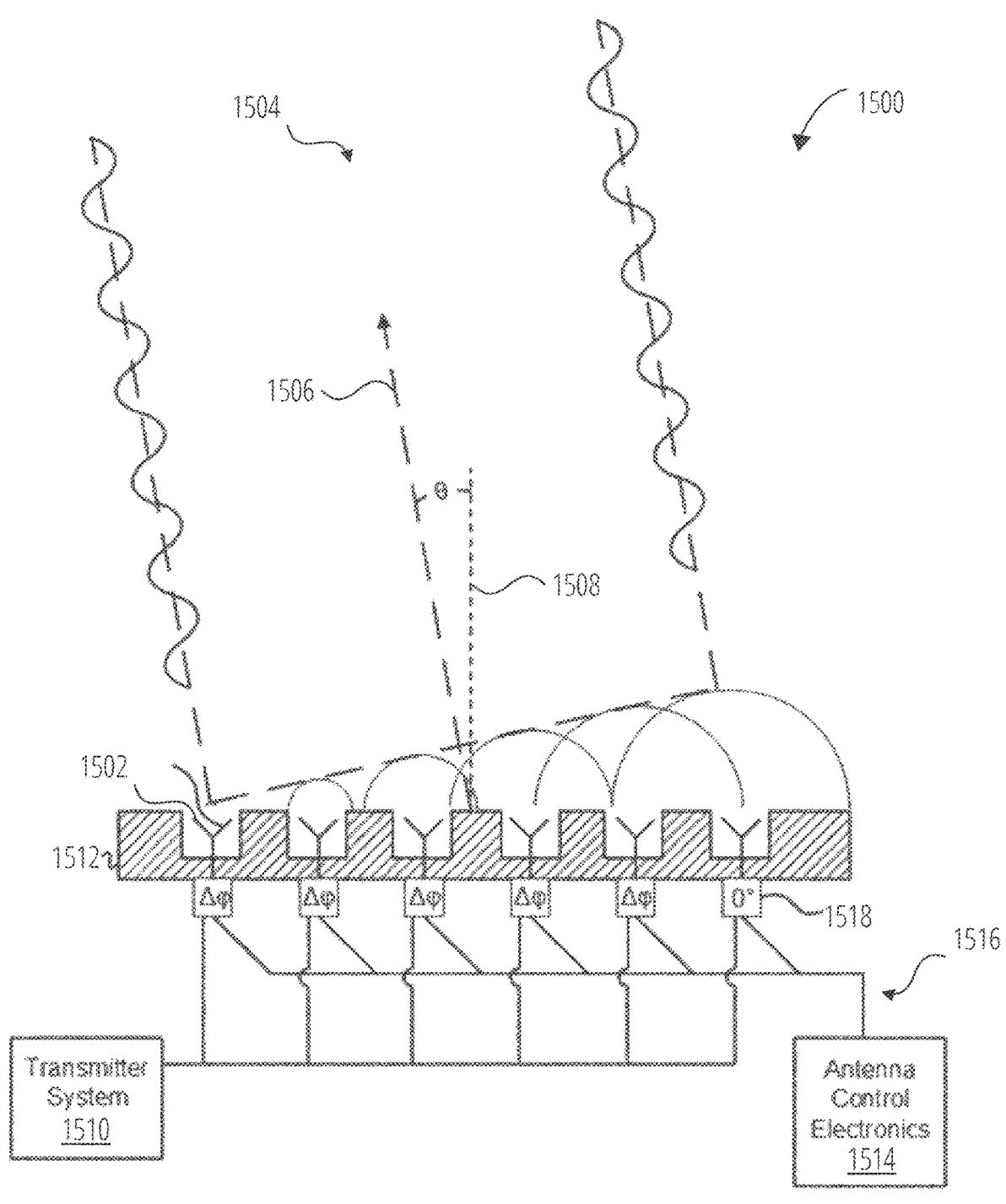
FIG. 15 illustrates a simplified schematic of an antenna, according to at least one embodiment.

FIG. 15 illustrates a simplified schematic of an antenna 1500, according to embodiments of the present disclosure. The antenna 1500 may be a component of the antenna system 1502 of FIG. 15. As illustrated, the antenna 1500 is a phased array antenna that includes multiple antenna elements 1502. Interference between the antenna elements 1502 forms a directional radiation pattern in both transmitter and receiver arrays, forming a beam 1504 (beam extents shown as dashed lines). The beam 1504 is a portion of a larger transmission pattern (not shown) that extends beyond the immediate vicinity of the antenna 1500. The beam 1504 is directed along a beam vector 1506, described by an angle "0" relative to an axis 1508 normal to a surface of the antenna 1500. As described below, the beam 1504 is one or more of steerable or shapeable through control of operating parameters including, but not limited to, a phase and an amplitude of each antenna element 1502.

In FIG. 15, the antenna 1500 includes, within a transmitter section 1512, the antenna elements 1502, which may include, but are not limited to, omnidirectional transmitter antennas coupled to a transmitter system 1510, such as the downlink transmitter 1350 of FIG. 13. The transmitter system 1510 provides a signal, such as a downlink signal, to be transmitted to a ground station on the surface. The downlink signal is provided to each antenna element 1502 as a time-varying signal that may include several multiplexed signals. To steer the beam 1504 relative to the axis 1508, the antenna 1500 (e.g., phased array antenna system) includes antenna control electronics 1514 controlling a radio frequency (RF) feeding network 1516, including multiple signal conditioning components 1518 interposed between the antenna elements 1502 and the transmitter system 1510. The signal conditioning components 1518 introduce one or more of a phase modulation or an amplitude modulation (e.g., by phase shifters), as denoted by "$\Delta\varphi$" in FIG. 15, to the signal sent to the antenna elements 1502. As shown in FIG. 15, introducing a progressive phase modulation produces interference in the individual transmission of each antenna element 1502 that generates the beam 1504.

The phase modulation imposed on each antenna element 1502 can differ and can be dependent on a spatial location of a communication target that determines an optimum beam vector (e.g., where the beam vector 1506 is found by one or more of maximizing signal intensity or connection strength). The optimum beam vector may change with time as the communication target 1410 moves relative to the antenna 1500 (e.g., phased array antenna system).

In the above description, numerous details are set forth. It will be apparent, however, to one of ordinary skill in the art having the benefit of this disclosure, that embodiments may be practiced without these specific details. In some instances, well-known structures and devices are shown in block diagram form rather than in detail in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein and is generally conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "sending," "receiving," "scheduling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, Read-Only Memories (ROMs), compact disc ROMs (CD-ROMs), magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A device comprising:

an analog-to-digital converter (ADC) that generates an input stream of incoming in-phase and quadrature (IQ) samples representing radio frequency (RF) signals representing RF signals received from a second device, wherein the ADC generates a first set of incoming IQ samples of the input stream at a first sampling rate associated with a carrier frequency and a first carrier frequency offset (CFO);

an input buffer coupled to the ADC to receive the input stream;

doppler filter logic coupled to the input buffer, wherein the doppler filter logic generates a second set of outgoing IQ samples by resampling the first set, wherein the second set is associated with a second sampling rate different than the first sampling rate, wherein the second sampling rate is associated with the carrier frequency;

an output buffer coupled to the doppler filter logic to receive the second set of outgoing IQ samples; and a controller coupled to the input buffer, the doppler filter logic, and the output buffer, wherein the controller:

determines, based on the first CFO, a first number of realignment events that occur within a period of time, wherein each realignment event corresponds to a loss of alignment between the first set of incoming IQ samples and the second set of outgoing IQ samples, wherein the loss of alignment is caused by a difference between the first sampling rate and the second sampling rate; and at each realignment event, one of:

prevents a write pointer from updating in response to the first sampling rate being higher than the second sampling rate, wherein preventing the write pointer from updating causes a first outgoing IQ sample of the second set to be overwritten by a second outgoing IQ sample of the second set, the first outgoing IQ sample generated prior to the second outgoing IQ sample; or prevents a read pointer from updating in response to the first sampling rate being lower than the second sampling rate, wherein preventing the read pointer from updating causes a third outgoing IQ sample of the second set to be a duplicate of a fourth outgoing IQ sample of the second set, the fourth outgoing IQ sample being generated prior to the third outgoing IQ sample.

2. The device of claim 1, wherein the controller uses a ratio between the first sampling rate and the second sampling rate to calculate the first number of realignment events.

3. The device of claim 1, wherein the ADC generates a third set of incoming IQ samples of the input stream at a third sampling rate associated with the carrier frequency combined with a second CFO different from the first CFO, and wherein the controller further determines, using a ratio between the third sampling rate and the second sampling rate, a second number of realignment events.

4. A method, comprising:

receiving, by an input buffer, a first set of incoming samples of an incoming data stream associated with a first frequency;

generating, using the first set of incoming samples, a first outgoing sample of an outgoing data stream, wherein the first outgoing sample is associated with a second frequency lower than the first frequency;

receiving, by an output buffer, the first outgoing sample;

determining, using a first ratio between the first and second frequencies, that the first outgoing sample is associated with a misalignment between the incoming data stream and the outgoing data stream;

receiving, by the input buffer, a second set of incoming samples associated with the first frequency;

generating, using the second set of incoming samples, a second outgoing sample associated with the second frequency; and overwriting, in the output buffer, the first outgoing sample with the second outgoing sample, wherein a write pointer corresponding to the output buffer is configured to update at each cycle of a clock, and wherein overwriting the first outgoing sample comprises enabling a gated clock that prevents the write pointer corresponding to the output buffer from updating at a cycle of the clock.

5. The method of claim 4, further comprising:

receiving, by the input buffer, a third set of incoming samples associated with a third frequency lower than the second frequency;

generating, using the third set of incoming samples, a third outgoing sample;

receiving, by the output buffer, the third outgoing sample;

determining, using a second ratio between the second frequency and the third frequency, that the third outgoing sample is associated with a misalignment between the incoming data stream and the outgoing data stream;

generating, using the third set of incoming samples, a fourth outgoing sample; and receiving, by the output buffer, the fourth outgoing sample, wherein the fourth outgoing sample is a duplicate of the third outgoing sample.

6. The method of claim 5, wherein a read pointer corresponding to the input buffer is configured to update at each cycle of the clock, and wherein the method further comprises enabling the gated clock that prevents the read pointer corresponding to the input buffer from updating at a cycle of the clock.

7. The method of claim 4, wherein a farrow filter generates the first outgoing sample, wherein a filter index of the farrow filter corresponds to the first outgoing sample, and wherein the method further comprises:

receiving, by a controller, the filter index; and overwriting, in response to the controller receiving the filter index, the first outgoing sample with the second outgoing sample.

8. The method of claim 4, wherein determining that the first outgoing sample is associated with a misalignment between incoming samples and outgoing samples further comprises comparing a first set of incrementing values corresponding to the first frequency to a second set of incrementing values corresponding to the second frequency.

9. The method of claim 8, further comprising:

generating the second set of incrementing values by multiplying the first set of incrementing values by the first ratio; and identifying a first value of the first set of incrementing values and a second value of the second set of incrementing values, the first and second values associated with the first outgoing sample, wherein a difference between the first and second values is equal to or greater than one.

10. The method of claim 4, further comprising generating, using a first phase-locked loop (PLL), the first set of incoming samples, wherein the first outgoing sample is generated without a second PLL or a hardware divider.

11. A device comprising:

an input buffer to receive a first set of samples, the first set of samples associated with a first frequency;

doppler filter logic coupled to the input buffer to generate a second set of samples by resampling the first set of samples, the second set of samples associated with a second frequency different than the first frequency, wherein an output buffer receives the second set of samples from the doppler filter logic; and a circuit to obtain a third set of samples from the output buffer, wherein the third set of samples is at least a subset of the second set of samples; and a controller coupled to the output buffer, wherein the controller is to:

determine that a first ratio indicates that the first frequency is lower than the second frequency;

determine, using the first ratio, a first subset of the third set of samples, wherein each sample of the first subset corresponds to a misalignment between the first set of samples and the second set of samples; and cause the doppler filter logic to generate a duplicate sample of each of the first subset, wherein the second set of samples comprises each duplicate sample.

12. The device of claim 11, wherein the input buffer is to receive a fourth set of samples associated with a third frequency, the doppler filter logic to generate a fifth set of samples by resampling the fourth set of samples, the fifth set of samples associated with the second frequency, wherein the output buffer receives the fifth set of samples from the doppler filter logic and the circuit is to obtain a sixth set of samples from the output buffer, wherein the sixth set of samples is a subset of the fifth set of samples, and wherein the controller is to:

determine that a second ratio indicates that the third frequency is higher than the second frequency;

determine, using the second ratio, a second subset of the fourth set of samples, wherein each of the second subset corresponds to a misalignment between the fourth set of samples and the fifth set of samples; and exclude each of the second subset from the sixth set of samples.

13. The device of claim 11, wherein a plurality of filter indices of the doppler filter logic each correspond to one of the second set of samples, and wherein each sample of the first subset is evenly spaced along the plurality of filter indices.

14. The device of claim 11, wherein the controller is coupled to the doppler filter logic, wherein a plurality of filter indices of the doppler filter logic each correspond to one sample of the first subset, and wherein the controller is further to:

receive, from the doppler filter logic, a first filter index of the plurality of filter indices corresponding to a first sample of the first subset; and enable, in response to receiving the first filter index, a gated clock.

15. The device of claim 14, wherein a read pointer corresponding to the input buffer is configured to update at each cycle of a clock, and wherein the gated clock prevents the read pointer from being updated at a cycle of the clock.

16. The device of claim 11, wherein the controller is further to determine the first subset by comparing a first set of incrementing values associated with the first frequency to a second set of incrementing values associated with the second frequency.

17. The device of claim 16, wherein the controller is further to:

generate the second set of incrementing values by multiplying the first set of incrementing values by the first ratio; and identify a first value of the first set of incrementing values and a second value of the second set of incrementing values, the first and second values associated with a sample of the first subset, wherein a difference between the first and second values is equal to or greater than one.

18. The device of claim 11, wherein the doppler filter logic generates the second set of samples by resampling the first set of samples using a farrow filter.

19. The device of claim 11, wherein the device further comprises divider-less circuitry to calculate the first ratio using an upsampling rate and a downsampling rate.

* * * * *